United States Patent
Suzuki et al.

(10) Patent No.: US 9,975,541 B2
(45) Date of Patent: May 22, 2018

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventors: Yoshitaka Suzuki, Nagakute (JP); Masato Nakano, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days. days.

(21) Appl. No.: 15/460,840

(22) Filed: Mar. 16, 2017

(65) Prior Publication Data

US 2017/0274888 A1 Sep. 28, 2017

(30) Foreign Application Priority Data

Mar. 25, 2016 (JP) ................................ 2016-062782

(51) Int. Cl.
*B60K 6/24* (2007.10)
*B60W 20/10* (2016.01)
(Continued)

(52) U.S. Cl.
CPC ............... *B60W 20/10* (2013.01); *B60K 6/24* (2013.01); *B60K 6/26* (2013.01); *B60K 6/28* (2013.01);
(Continued)

(58) Field of Classification Search
CPC .......... B60W 20/10; B60W 2510/081; B60W 2510/244; B60W 2710/083; B60K 6/24;
(Continued)

(56) References Cited

U.S. PATENT DOCUMENTS 6,784,563 B2 * 8/2004 Nada ....................... F02N 11/04
 180/65.235
9,061,683 B2 * 6/2015 Ueda ....................... B60K 6/442
(Continued)

FOREIGN PATENT DOCUMENTS

JP 2000-083301 A 3/2000
JP 2004-017919 A 1/2004
(Continued)

OTHER PUBLICATIONS

Lian et al., Control Strategy and Simulation Technology of Integrated Starter/Generator Hybrid Electric Vehicle, 2009, IEEE, p. 1369-1373 (Year: 2009).*

(Continued)

*Primary Examiner* — McDieunel Marc
(74) *Attorney, Agent, or Firm* — Oliff PLC

(57) ABSTRACT

A control device for hybrid vehicle includes an electronic control unit. The electronic control unit is configured to: calculate required electric power required for a motor for electric power generation as electric power supplied to a motor for drive based on required drive power of the hybrid vehicle; calculate an electric power suppliable time of the capacitor; and determine a rotation speed increase standby time of the internal combustion engine such that rotation speed increase standby time becomes shorter than a spare time. The spare time is a time obtained by subtracting an electric power generation delay time from the electric power suppliable time. The electric power generation delay time is a time from a time of starting the rotation speed increase until a time of starting electric power generation of the motor for electric power generation.

7 Claims, 11 Drawing Sheets

(51) Int. Cl.
*B60K 6/26* (2007.10)
*B60K 6/28* (2007.10)
*B60K 6/365* (2007.10)
*B60K 6/46* (2007.10)
*B60L 11/18* (2006.01)

(52) U.S. Cl.
CPC ............... *B60K 6/365* (2013.01); *B60K 6/46* (2013.01); *B60L 11/1861* (2013.01); *B60L 2240/421* (2013.01); *B60L 2240/423* (2013.01); *B60L 2240/52* (2013.01); *B60L 2240/549* (2013.01); *B60W 2510/081* (2013.01); *B60W 2510/244* (2013.01); *B60W 2710/081* (2013.01); *B60W 2710/083* (2013.01); *B60W 2710/244* (2013.01); *B60Y 2200/92* (2013.01); *Y10S 903/905* (2013.01); *Y10S 903/906* (2013.01); *Y10S 903/907* (2013.01)

(58) Field of Classification Search
CPC .. B60K 6/28; B60K 6/365; B60K 6/46; B60L 11/1861; B60L 2240/423; B60L 2240/52; B60L 2240/549; B60Y 2200/92; Y10S 903/905; Y10S 903/906; Y10S 903/907
USPC .......................................................... 701/22
See application file for complete search history.

(56) References Cited

U.S. PATENT DOCUMENTS

| | | | | |
|---|---|---|---|---|
| 9,796,376 | B2* | 10/2017 | Inoue | B60W 10/06 |
| 2001/0048226 | A1* | 12/2001 | Nada | F02N 11/04 |
| | | | | 290/40 C |
| 2003/0102673 | A1* | 6/2003 | Nada | F02N 11/04 |
| | | | | 290/40 C |
| 2012/0226401 | A1* | 9/2012 | Naito | B60K 6/445 |
| | | | | 701/22 |
| 2016/0272194 | A1* | 9/2016 | Inoue | B60W 10/06 |
| 2017/0225671 | A1* | 8/2017 | Ukegawa | B60W 20/13 |
| 2017/0274754 | A1* | 9/2017 | Imamura | B60K 6/365 |
| 2017/0282901 | A1* | 10/2017 | Imamura | B60W 20/15 |

FOREIGN PATENT DOCUMENTS

| | | |
|---|---|---|
| JP | 2005-102425 A | 4/2005 |
| JP | 2014-218202 A | 11/2014 |

OTHER PUBLICATIONS

Lidozzi et al., Ultracapacitors equipped hybrid electric microcar, 2010, IEEE, p. 618-628 (Year: 2010).*

Sefik et al., Electric double layer capacitor impact on the performance of Hybrid Electric Vehicle, 2012, IEEE, p. 1-6 (Year: 2012).*

Onea et al., Power management solutions for hybrid electric vehicles, 2013, IEEE, p. 1-8 (Year: 2013).*

* cited by examiner

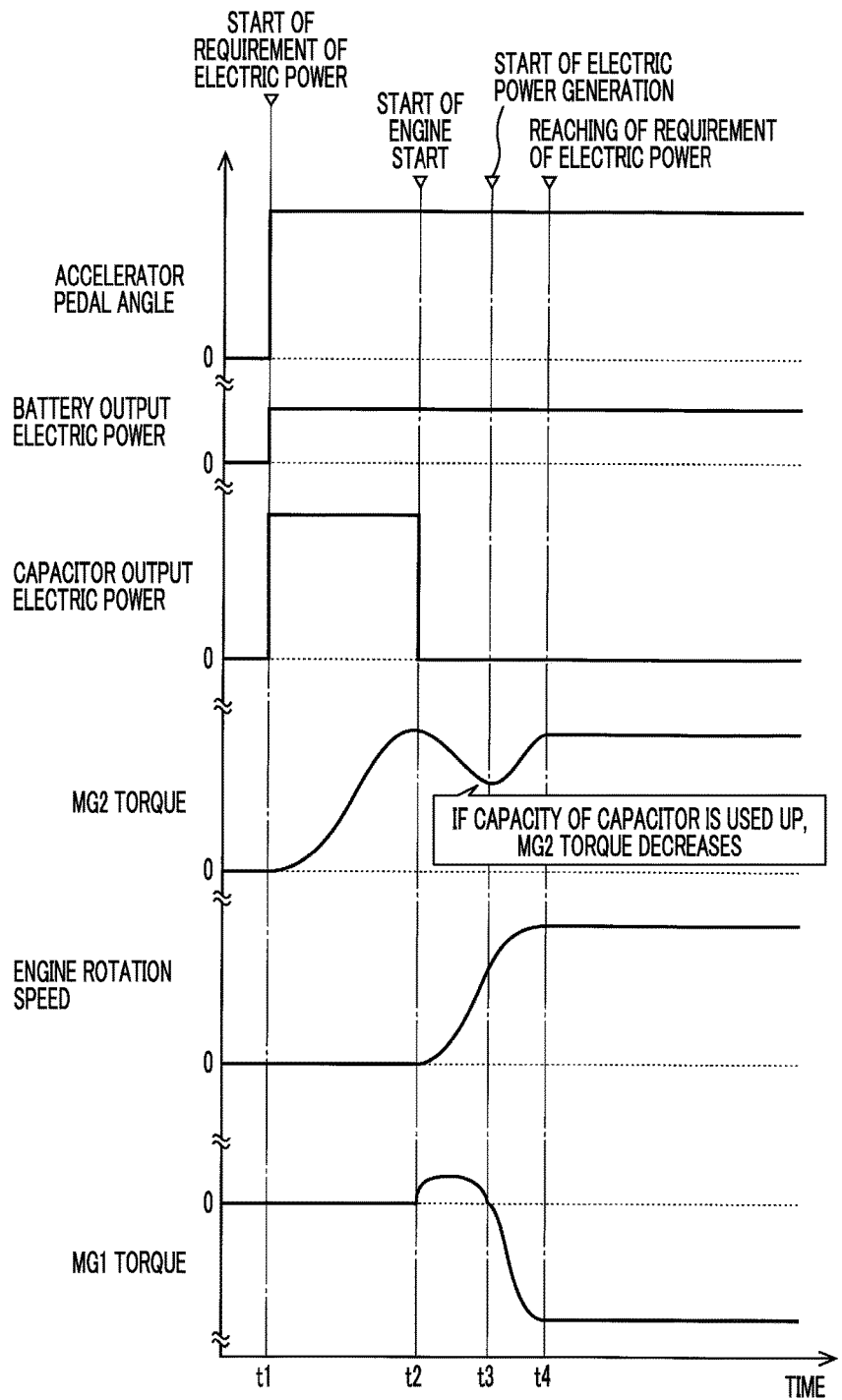

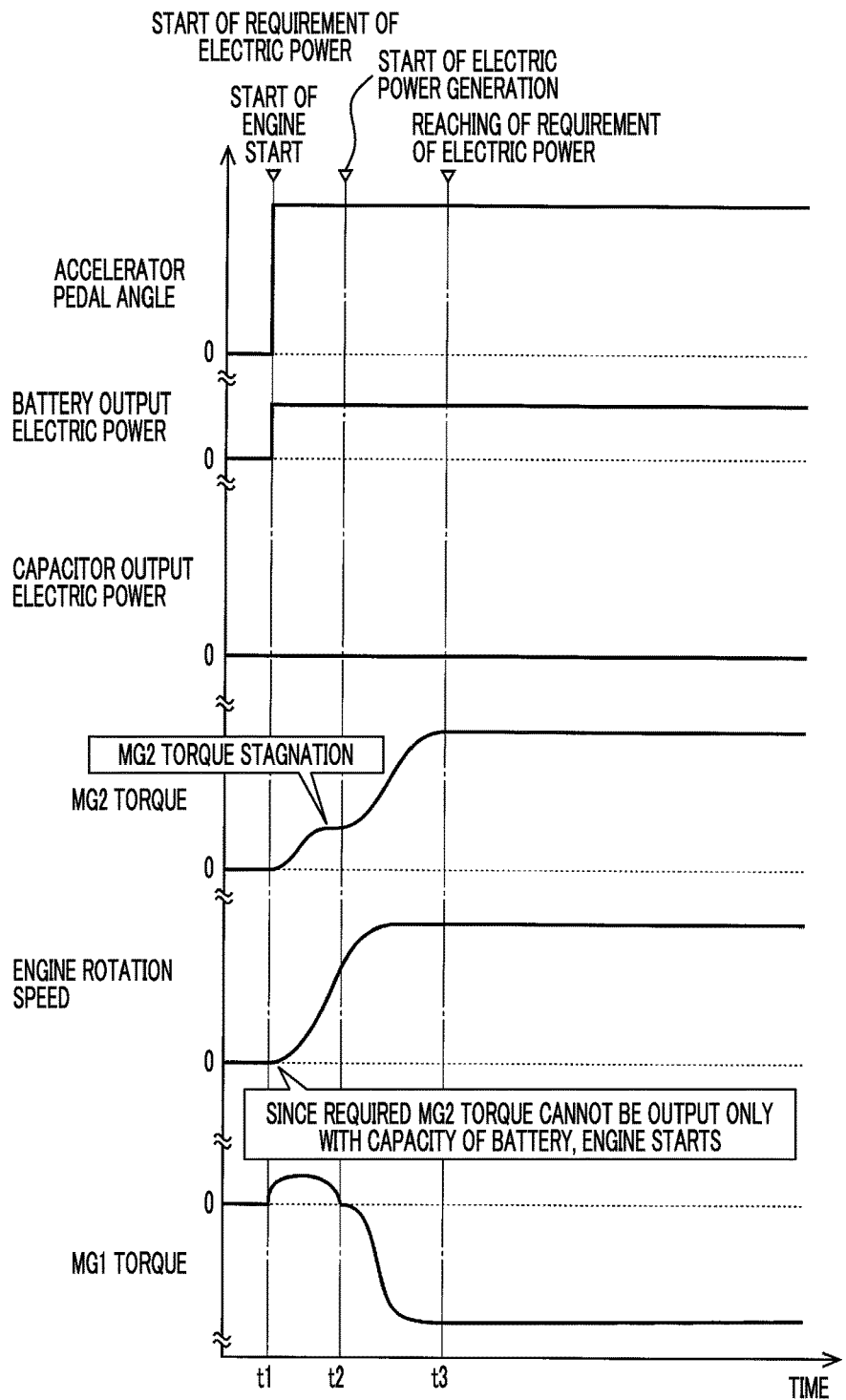

CONTROL DEVICE FOR HYBRID VEHICLE

INCORPORATION BY REFERENCE

The disclosure of Japanese Patent Application No. 2016-062782 filed on Mar. 25, 2016 including the specification, drawings and abstract is incorporated herein by reference in its entirety.

BACKGROUND

1. Technical Field

The present disclosure relates to a control device for a hybrid vehicle provided with a motor for drive, a capacitor, a motor for electric power generation, and an internal combustion engine.

2. Description of Related Art

A hybrid vehicle provided with a motor for drive configured to generate power for traveling, a capacitor configured to supply stored electric power to the motor for drive, a motor for electric power generation configured to supply generated electric power to the motor for drive, and an internal combustion engine configured to output power causing the motor for electric power generation to generate electric power is well known. For example, an example of such a hybrid vehicle is a hybrid vehicle described in Japanese Patent Application Publication No. 2014-218202 (JP 2014-218202 A). JP 2014-218202 A discloses a hybrid vehicle which is provided with a battery as a main power storage unit and a capacitor as an auxiliary power storage unit capable of supplying electric power to a motor for traveling and allows electric power to be supplied from the capacitor to the motor for traveling in consideration of fuel efficiency.

SUMMARY

On the other hand, in a drive power non-generation state of the internal combustion engine in which power generated (unless otherwise specified, torque or force has the same meaning) by the internal combustion engine does not directly contribute to vehicle traveling and electric power generated by the motor for electric power generation with power generated by the internal combustion engine is not supplied to the motor for drive, when accelerating with an output of the motor for drive, it is considered that the motor for drive is first driven with electric power supplied from the capacitor, and the motor for drive is then driven with the generated electric power of the motor for electric power generation with power of the internal combustion engine. In such a case, if rotation speed increase control for increasing the rotation speed of the internal combustion engine for electric power generation of the motor for electric power generation after electric power has not been supplied from the capacitor starts to supply the generated electric power of the motor for electric power generation to the motor for drive, compensation for electric power with electric power generation of the motor for electric power generation is delayed with respect to a decrease in electric power of the capacitor. For this reason, the output of the motor for drive temporarily decreases and the required drive power of the vehicle cannot be satisfied, whereby drivability may be degraded.

The present disclosure provides a control device for a hybrid vehicle capable of suppressing degradation of drivability when accelerating with an output of a motor for drive.

A control device for hybrid vehicle according to an aspect of the present disclosure is provided. The hybrid vehicle includes a motor for drive, a capacitor, a motor for electric power generation, and an internal combustion engine. The motor for drive is configured to generate power for traveling the vehicle. The capacitor is configured to supply stored electric power to the motor for drive. The motor for electric power generation is configured to supply generated electric power to the motor for drive. The internal combustion engine is configured to outputs power to cause the motor for electric power generation to generate electric power. The control device includes an electronic control unit. The electronic control unit is configured to: calculate required electric power required for the motor for electric power generation as electric power supplied to the motor for drive based on required drive power of the hybrid vehicle; calculate an electric power suppliable time of the capacitor; and determine a rotation speed increase standby time of the internal combustion engine such that the rotation speed increase standby time becomes shorter than a spare time. The electric power suppliable time is a time from a time of starting a requirement of the required electric power until a time when charging capacity of the capacitor decreases to target residual capacity. The rotation speed increase standby time is a time from the time of starting the requirement of the required electric power until a time of starting a rotation speed increase. The time of starting the rotation speed increase is a time when the internal combustion engine, which is in a drive power non-generation state at the time of starting the requirement of the required electric power, starts rotation speed increase control for increasing the rotation speed for electric power generation of the motor for electric power generation. The spare time is a time obtained by subtracting an electric power generation delay time from the electric power suppliable time. The electric power generation delay time is a time from the time of starting the rotation speed increase until a time of starting electric power generation of the motor for electric power generation.

According to the control device of this aspect, the rotation speed increase standby time is determined such that the rotation speed increase standby time from the time of starting the requirement of the required electric power until the time of starting a rotation speed increase becomes shorter than the spare time obtained by subtracting, from the electric power suppliable time for which the capacitor is able to supply electric power, the predetermined electric power generation delay time from the time of starting a rotation speed increase when the rotation speed increase control for the internal combustion engine starts until the time of starting electric power generation of the motor for electric power generation. For this reason, the motor for drive is started to be driven with electric power supplied from the capacitor, and then, when the electric power suppliable time has elapsed and the capacitor does not supply electric power, the motor for drive is driven with the generated electric power of the motor for electric power generation. Hence, it is possible to suppress degradation of drivability when accelerating with an output of the motor for drive. Furthermore, when the rotation speed increase control of the internal combustion engine is delayed with respect to the time of starting the requirement, whereby it is possible to improve fuel efficiency.

In the control device according to the above-described aspect, the electronic control unit may be configured to calculate a required reaching time. The required reaching time may be a time from the time of starting electric power generation until a time of reaching of the requirement when the generated electric power of the motor for electric power generation reaches the required electric power. The electronic control unit may be configured to determine the rotation speed increase standby time such that the rotation speed increase standby time is equal to or less than a spare time obtained by subtracting the electric power generation delay time and the required reaching time from the electric power suppliable time.

According to the control device of this aspect, the rotation speed increase standby time is determined such that the rotation speed increase standby time becomes equal to or less than the spare time obtained by subtracting, from the electric power suppliable time, the electric power generation delay time and the required reaching time until the generated electric power of the motor for electric power generation reaches the required electric power. For this reason, the motor for drive is started to be driven with electric power supplied from the capacitor, and then, when the electric power suppliable time has elapsed and the capacitor does not supply electric power, the required electric power is satisfied with the generated electric power of the motor for electric power generation. Hence, it is possible to further suppress degradation of drivability when accelerating with the output of the motor for drive. Furthermore, the rotation speed increase control of the internal combustion engine is delayed with respect to the time of starting the requirement, whereby it is possible to improve fuel efficiency.

In the control device according to the above-described aspect, the electric power suppliable time may include a time for which the capacitor is able to supply the required electric power.

According to the control device of this aspect, since the electric power suppliable time includes a time for which the capacitor is able to supply the required electric power, acceleration is appropriately performed with the output of the motor for drive.

In the control device according to the above-described aspect, the electronic control unit may be configured to gradually decrease electric power supplied from the capacitor from the required electric power toward zero in conformity with an increase of the generated electric power of the motor for electric power generation from the time of starting electric power generation.

According to the control device of this aspect, electric power supplied from the capacitor gradually decreases from the required electric power toward zero in conformity with the increase of the generated electric power of the motor for electric power generation from the time of starting electric power generation. After electric power supplied from the capacitor decreases, the generated electric power of the motor for electric power generation instantly compensates for electric power. Hence, it is possible to further suppress degradation of drivability when accelerating with the output of the motor for drive. Furthermore, electric power supplied to the motor for drive is smoothly switched from electric power supplied from the capacitor to the generated electric power of the motor for electric power generation, and smooth acceleration is obtained.

In the control device according to the above-described aspect, the electric power suppliable time may include a time for which the capacitor is able to supply the required electric power and a time for which electric power supplied from the capacitor gradually decreases from the required electric power toward zero.

According to the control device of this aspect, the electric power suppliable time includes the time for which the capacitor is able to supply the required electric power and the time for which electric power supplied from the capacitor gradually decreases from the required electric power toward zero. For this reason, acceleration is appropriately performed with the output of the motor for drive, and electric power supplied to the motor for drive is smoothly switched from electric power supplied from the capacitor to the generated electric power of the motor for electric power generation. Furthermore, since the electric power suppliable time is further extended, the rotation speed increase standby time is extended, whereby it is possible to further improve fuel efficiency.

In the control device according to the above-described aspect, the electronic control unit may be configured to make the rotation speed increase standby time zero in a case where electric power to be output from the capacitor is less than the required electric power. The electronic control unit may be configured to calculate a required reaching time from the time of starting electric power generation until the time of reaching of the requirement when the generated electric power of the motor for electric power generation reaches the required electric power. The electronic control unit may be configured to gradually decrease electric power supplied from the capacitor toward zero from the time of starting the requirement such that the electric power suppliable time becomes equal to or greater than a total time of the electric power generation delay time and the required reaching time.

According to the control device of this aspect, the rotation speed increase standby time becomes zero in a case where electric power to be output from the capacitor is less than the required electric power, and electric power supplied from the capacitor gradually decreases toward zero from the time of starting the requirement such that the electric power suppliable time becomes equal to or greater than the total time of the electric power generation delay time and the required reaching time. Even in a case where electric power to be output from the capacitor is less than the required electric power, it is possible to compensate for a shortage of the generated electric power of the motor for electric power generation from the time of starting the requirement until the time of reaching of the requirement using electric power of the capacitor, and to suppress degradation of drivability. That is, in a case where electric power to be output from the capacitor is less than the required electric power, an aspect in which electric power of the capacitor compensates for a delay of the supply of generated electric power of the motor for electric power generation is employed, instead of employing an aspect in which electric power is not supplied from the capacitor. For this reason, it is possible to suppress degradation of drivability.

In the control device according to the above-described aspect, the hybrid vehicle may include a battery which is able to supply stored electric power to the motor for drive. The capacitor may be configured to supply electric power to the motor for drive in addition to electric power supplied from the battery. The electronic control unit may be configured to calculate, as the required electric power, a shortage of electric power with electric power supplied from the battery with respect to electric power required for an output of the motor for drive implementing the required drive power of the hybrid vehicle.

According to the control device of this aspect, a shortage of electric power with electric power supplied from the battery is supplied with the generated electric power of the motor for electric power generation. When the supply of generated electric power of the motor for electric power generation is started, after electric power of the capacitor is supplied, the motor for drive is driven with the generated electric power of the motor for electric power generation. Therefore, it is possible to suppress degradation of drivability when accelerating with the output of the motor for drive.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 10 is a time chart in a case where the control operation shown in the flowchart of FIG. 9 is executed in a case where the engine is in the operation stop state, and shows an example of a case where shortage MG2 power is covered with the MG2 power for capacitor output electric power; and FIG. 11 is a time chart in a case where the control operation shown in the flowchart of FIG. 9 is executed in a case where the engine is in the operation stop state, and shows an example of a case where shortage MG2 power is not covered with MG2 power for capacitor output electric power.

DETAILED DESCRIPTION OF EMBODIMENTS

Figure 1:
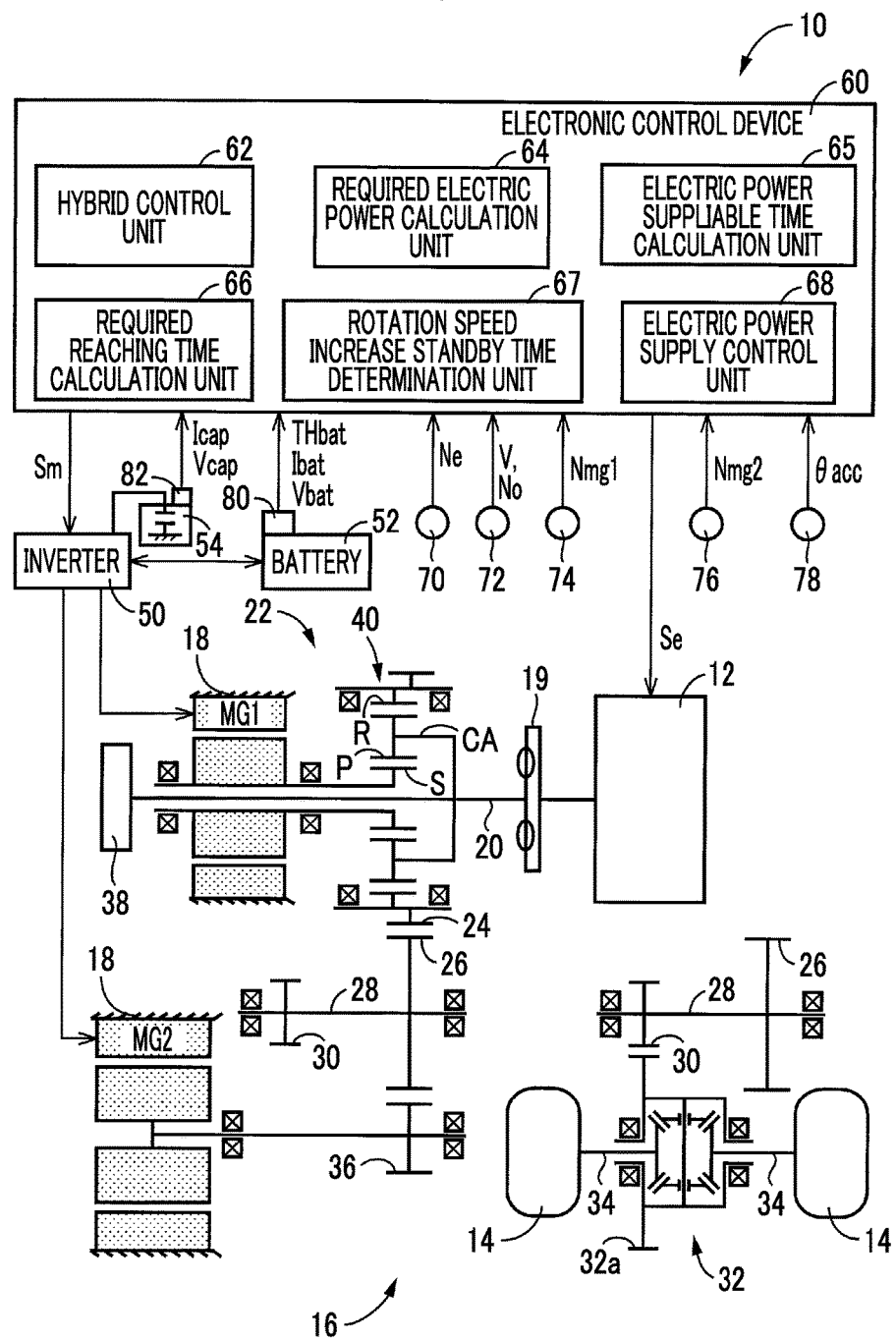
FIG. 1 is a diagram illustrating the schematic configuration of a vehicle to which the present disclosure is applied, and is a diagram illustrating a main part of a control system and a control function for various kinds of control in the vehicle.

Hereinafter, an example of the present disclosure will be described in detail referring to the drawings.

FIG. 1 is a diagram illustrating the schematic configuration of a hybrid vehicle 10 (hereinafter, referred to as a vehicle 10) to which the present disclosure is applied, and is a diagram illustrating a main part of a control system for various kinds of control in the vehicle 10. In FIG. 1, the vehicle 10 is a hybrid vehicle which is provided with an engine 12 as an internal combustion engine which is a drive power source for traveling generating power for traveling, and a second electric motor MG2 as a motor for drive. Furthermore, the vehicle 10 is provided with drive wheels 14, a power transmission device 16 provided in a power transmission path between the engine 12 and the drive wheels 14, and a first electric motor MG1.

The power transmission device 16 is housed in an unrotatable case 18 which is a non-rotating member attached to a vehicle body. The power transmission device 16 is provided with a damper 19 coupled to the engine 12, an input shaft 20 coupled to the damper 19, a gear shift unit 22 coupled to the input shaft 20, a driven gear 26 which meshes with a drive gear 24 as an output rotating member of the gear shift unit 22, a final gear 30 which is provided to be relatively unrotatable in a driven shaft 28 fixing the driven gear 26 to be relatively unrotatable and has a diameter smaller than the driven gear 26, a differential gear 32 which meshes with the final gear 30 through a differential ring gear 32a, an axle 34 coupled to the differential gear 32, a reduction gear 36 which meshes with the driven gear 26, is coupled to the second electric motor MG2, and has a diameter smaller than the driven gear 26, a mechanical oil pump 38 (hereinafter, referred to as a MOP 38) which is driven through the input shaft 20 when the input shaft 20 is rotationally driven by the engine 12, and the like. In the power transmission device 16 configured as above, power (unless otherwise specified, torque or force has the same meaning) output from the engine 12 or power output from the second electric motor MG2 is transmitted to the driven gear 26, and is transmitted from the driven gear 26 to the drive wheels 14 through the final gear 30, the differential gear 32, the axle 34, and the like in order.

The gear shift unit 22 has a planetary gear mechanism 40 as a power distribution mechanism which distributes power transmitted from the engine 12 through the input shaft 20 to the first electric motor MG1 and the drive gear 24. The planetary gear mechanism 40 is a known single-pinion type planetary gear device provided with a sun gear S, a pinion gear P, a carrier CA which supports the pinion gear P to be rotatable and revolvable, and a ring gear R which meshes with the sun gear S through the pinion gear P, and functions as a different mechanism which generates a differential action. In the planetary gear mechanism 40, the sun gear S is coupled to the first electric motor MG1, the carrier CA is coupled to the engine 12 through the input shaft 20, and the ring gear R is formed in the inner circumferential surface of the drive gear 24. In the planetary gear mechanism 40 configured as above, the first electric motor MG1 generates electric power with power of the engine 12 distributed to the first electric motor MG1, and the generated electric power is stored or the second electric motor MG2 is driven with the electric power. With this, the gear shift unit 22 functions an electric differential unit (electric continuously variable transmission) in which a gear ratio is controlled by controlling the operation state of the first electric motor MG1 In this way, the first electric motor MG1 is a motor for electric power generation which is able to supply the generated electric power to the second electric motor MG2, and the engine 12 is an internal combustion engine which outputs power to cause the first electric motor MG1 to generate electric power.

The MOP 38 is rotationally driven by the engine 12 and supplies (ejects) oil used for lubricating or cooling the respective units of the power transmission device 16, such as the differential gear 32, the reduction gear 36, the planetary gear mechanism 40, and a ball bearing.

The vehicle 10 is further provided with an inverter 50 which controls transmission and reception of electric power related to operation of each of the electric motors MG1, MG2 such that output torque (powering torque or regenerative torque) required for each of the first electric motor MG1 and the second electric motor MG2 is obtained, a battery 52 as a power storage device which performs transmission and reception of electric power with respect to each of the first electric motor MG1 and the second electric motor MG2, and a capacitor 54 as a capacitor which performs transmission and reception of electric power with respect to each of the first electric motor MG1 and the second electric motor MG2. Each of the battery 52 and the capacitor 54 is a power storage device which is able to store electric power generated by each of the first electric motor MG1 and the second electric motor MG2 and to supply the stored electric power to each of the first electric motor MG1 and the second electric motor MG2. For example, a maximum value of charging capacity (that is, battery residual capacity) SOCbat of the battery 52 is greater than a maximum value of a charging capacity (that is, capacitor residual capacity) SOCcap of the capacitor 54, and a maximum value of electric power (that is, capacitor output electric power) Pcap output (supplied) from the capacitor 54 is greater than a maximum value of electric power (that is, battery output electric power) Pbat output (supplied) from the battery 52. Accordingly, the battery 52 is a main power storage device Which continuously outputs the electric power Pbat. Furthermore, the capacitor 54 is a sub-power storage device which temporarily outputs a part or the whole of a shortage of electric power with the battery output electric power Pbat, and is an auxiliary power storage device which supplies the electric power Pcap to the second electric motor MG2 in addition to the battery output electric power Pbat.

Both of the first electric motor MG1 and the second electric motor MG2 are motor generators which have a function as a motor (motor) operable to generate mechanical power from electric power and a function as a power generator (generator) operable to generate electric power from mechanical power, and are selectively operated as a motor or a power generator. Each of the electric motors MG1, MG2 is connected to the battery 52 (and the capacitor 54) through the inverter 50, and the inverter 50 is controlled by an electronic control unit 60 described below, whereby MG1 torque Tmg1 which is output torque of the first electric motor MG1 and MG2 torque Tmg2 which is output torque of the second electric motor MG2 are controlled.

The vehicle 10 is further provided with an electronic control unit 60 including a control device of the vehicle 10 related to control of the engine 12, control of the electric motors MG1, MG2, or the like. Hence, FIG. 1 is a diagram showing an input/output system of the electronic control unit 60, and is a functional block diagram illustrating a main part of a control function of the electronic control unit 60. The electronic control unit 60 includes a so-called microcomputer provided with, for example, a CPU, a RAM, a ROM, an input/output interface, and the like, and the CPU performs signal processing according to a program stored in advance in the ROM while using a temporary storage function of the RAM vehicle 10, thereby executing various kinds of control of the vehicle 10. For example, the electronic control unit 60 executes vehicle control, such as hybrid drive control relating to the engine 12, the first electric motor MG1, the second electric motor MG2, or the like, and includes each computer for engine control, electric motor control, or the like as necessary.

To the electronic control unit 60, various actual values (for example, an engine rotation speed Ne, an output rotation speed No which is the rotation speed of the drive gear 24 corresponding to a vehicle speed V, a MG1 rotation speed Nmg1 which is the rotation speed of the first electric motor MG1, a MG2 rotation speed Nmg2 which is the rotation speed of the second electric motor MG2, an accelerator pedal angle θacc, a battery temperature THbat, a battery charging/discharging current Ibat, a battery voltage Vbat of the battery 52, a capacitor charging/discharging current Icap or a capacitor voltage Vcap of the capacitor 54, and the like) based on detection signals detected by various sensors (for example, an engine rotation speed sensor 70, an output rotation speed sensor 72, a MG1 rotation speed sensor 74, such as a resolver, a MG2 rotation speed sensor 76, such as a resolver, an accelerator pedal angle sensor 78, a battery sensor 80, a capacitor sensor 82, and the like) in the vehicle 10 are supplied. From the electronic control unit 60, various command signals (for example, an engine control command signal Se for controlling the engine 12, an electric motor control command signal Sm for operating the inverter 50 controlling each of the electric motors MG1, MG2, and the like) are output to the respective devices (for example, an engine control device such as a throttle actuator or a fuel injection device, the inverter 50, and the like) in the vehicle 10. The electronic control unit 60 calculates the battery residual capacity SOCbat based on the battery charging/discharging current Ibat, the battery voltage Vbat, and the like and calculates the capacitor residual capacity SOCcap based on the capacitor charging/discharging current Icap, the capacitor voltage Vcap, and the like, for example,.

The electronic control unit 60 is provided with hybrid control means, that is, a hybrid control unit 62 in order to implement the control function for various kinds of control in the vehicle 10.

The hybrid control unit 62 controls opening and closing of an electronic throttle valve, controls a fuel injection amount or an injection timing, and outputs the engine control command signal Se for controlling an ignition timing to execute output control of the engine 12 such that a target value of engine torque Te is obtained. Furthermore, the hybrid control unit 62 outputs the electric motor control command signal Sm for controlling the operation of the first electric motor MG1 or the second electric motor MG2 to the inverter 50 to execute output control of the first electric motor MG1 or the second electric motor MG2 such that a target value of the MG1 torque Tmg1 or the MG2 torque Tmg2 is obtained.

Specifically, the hybrid control unit 62 applies the accelerator pedal angle θacc or the vehicle speed V to a relationship (required drive power map) calculated in advance (determined in advance) by an experiment or in design to calculate required drive power Fddem in the drive wheels 14 as a required drive amount of a driver to the vehicle 10. Then, the hybrid control unit 62 implements the required drive power Fddem with an output (engine power Pe [W] and/or MG2 power Pmg2[W]) from at least one of the engine 12 or the second electric motor MG2 such that driving with low fuel consumption and a small amount of exhaust gas is performed in consideration of a transmission loss, an accessory load, a required charging value (required charging power), and the like. As the required drive amount, in addition to the required drive power Fddem [N], required drive power [W] in the drive wheels 14, require drive torque [Nm] in the drive wheels 14, or the like may be used. Furthermore, as the required drive amount, the accelerator pedal angle θacc [%], a throttle valve opening [%], an intake air amount [g/sec], or the like may be simply used.

The hybrid control unit 62 selectively establishes, as a traveling mode, an EV traveling mode or an HV traveling mode described below according to a traveling state. For example, the hybrid control unit 62 establishes the EV traveling mode in a case where the required drive power Fddem is in a motor traveling region smaller than a threshold determined in advance, and establishes the HV traveling mode in a case where the required drive power Fddem is in an engine traveling region equal to or greater than the threshold determined in advance. Furthermore, the hybrid control unit 62 establishes the HV traveling mode in a case where the battery residual capacity SOCbat becomes less than a threshold determined in advance even when the required drive power Fddem is in the motor traveling region.

When the EV traveling mode is established, the hybrid control unit 62 stops the operation of the engine 12 and enables motor traveling (EV traveling) with only the second electric motor MG2 as a drive power source for traveling.

When the HV traveling mode is established, the hybrid control unit 62 bears reaction force to the power of the engine 12 with electric power generation of the first electric motor MG1 to transmit directly transmitted engine torque to the drive gear 24 and drives the second electric motor MG2 with the generated electric power of the first electric motor MG1 to transmit torque to the drive wheels 14, thereby enabling engine traveling with at least the engine 12 as a drive power source for traveling. That is, in a case where the HV traveling mode is established, the hybrid control unit 62 controls the operation state of the first electric motor MG1 to enable engine traveling in which traveling is performed by transmitting the power of the engine 12 to the drive wheels 14. In the HV traveling mode, traveling may be performed by further adding drive torque of the second electric motor MG2 using power from the battery 52.

Figure 2:
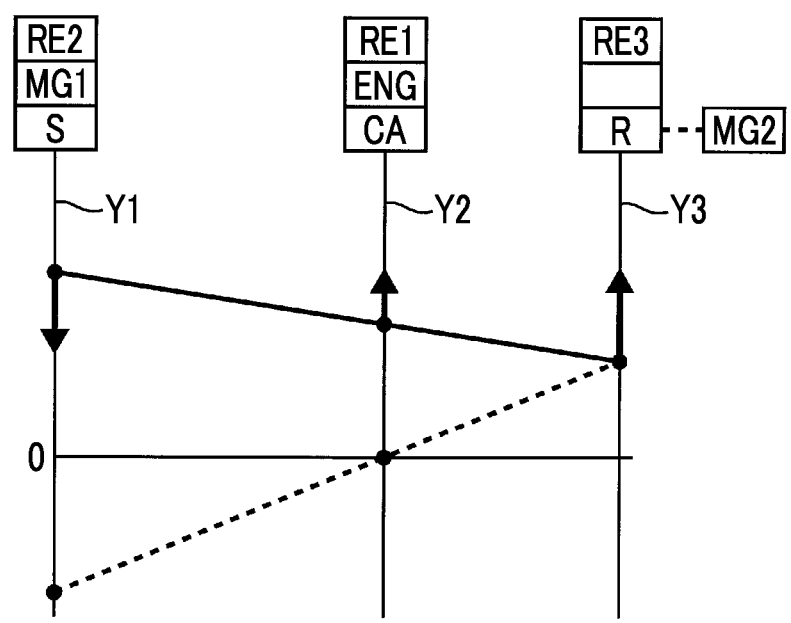
FIG. 2 is a collinear diagram capable of relatively representing a rotation speed of each rotating element in a planetary gear mechanism, a solid line indicates an example of a traveling state in an HV traveling mode, and a broken line indicates an example of a traveling state in an EV traveling mode.

FIG. 2 is a collinear diagram capable of relatively representing the rotation speeds of three rotating elements RE1, RE2, RE3 in the planetary gear mechanism 40. The collinear diagram has vertical lines Y1 to Y3 in order from the left toward the paper, the vertical line Y1 indicates the rotation speed of the sun gear S which is a second rotating element RE2 coupled to the first electric motor MG1, the vertical line Y2 indicates the rotation speed of the carrier CA which is a first rotating element RE1 coupled to the engine (ENG) 12, and the vertical line Y3 indicates the rotation speed of the ring gear R which is a third rotating element RE3 coupled to the second electric motor MG2 through the driven gear 26, the reduction gear 36, and the like. A solid line of FIG. 2 indicates an example of a relative speed of each rotating element in a traveling state in the HV traveling mode, and a broken line of FIG. 2 indicates an example of a relative speed of each rotating element in a traveling state in the EV traveling mode.

The operation of the vehicle 10 in the HV traveling mode will be described using the solid line of FIG. 2. The MG1 torque Tmg1 is input to the sun gear S with respect to the engine torque Te which is input to the carrier CA. At this time, for example, it is possible to perform control for setting an operation point of the engine 12 represented by the engine rotation speed Ne and the engine torque Te as an operation point with the best fuel efficiency through powering control or reaction force control of the first electric motor MG1. This type of hybrid form is called a mechanical distribution type or a split type.

The operation of the vehicle 10 in the EV traveling mode will be described using the broken line of FIG. 2. The engine 12 is not driven (that is, the engine 12 is in an operation stop state), the first electric motor MG1 is a no-load state (free), and the engine rotation speed Ne becomes zero. In this state, the powering torque of the second electric motor MG2 is transmitted to the drive wheels 14 as drive power in a vehicle forward movement direction. Although a case where the engine 12 is brought into the operation stop state in the EV traveling mode has been illustrated, the engine 12 may be in a drive power non-generation state in the EV traveling mode. The drive power non-generation state of the engine 12 is a state in which power generated by the engine 12 does not directly contribute to traveling (drive power) of the vehicle 10 and a state in which electric power generated by the first electric motor MG1 with power generated by the engine 12 is not supplied to the second electric motor MG2. As the drive power non-generation state of the engine 12, for example, a case where the engine 12 is in the operation stop state, a case where the engine 12 is in an idling state, or a case where the engine 12 is in a motoring state of being rotationally driven by the first electric motor MG1 is exemplified. The idling state of the engine 12 is a state in which the engine 12 outputs power for driving vehicle accessories and is driven at a low engine rotation speed Ne, such as an idling rotation speed, in order to output power required for an autonomous operation of the engine 12, in which power generated by the engine 12 does not directly contributes to vehicle traveling, and electric power generated by the first electric motor MG1 with power generated by the engine 12 is not supplied to the second electric motor MG2, for example. The motoring state of the engine 12 is a state in which the output shaft of the engine 12 is rotationally driven at a low engine rotation speed Ne by the first electric motor MG1, the engine 12 does not generate power contributing to vehicle traveling, and electric power generation of the first electric motor MG1 is not performed since the first electric motor MG1 is powering (outputs positive torque), for example, A case where there is a shortage of electric power required for the MG2 power Pmg2, which is the output of the second electric motor MG2 implementing the required drive power Fddem of the vehicle 10, with the battery output electric power Pbat in the EV traveling mode since an upper limit of the output of the battery output electric power Pbat becomes small due to any reason, such as a low battery temperature THbat is considered. In such a case, it is considered that the second electric motor MG2 is driven with the capacitor output electric power Pcap, and then, the second electric motor MG2 is driven with the generated electric power Pmg1 of the first electric motor MG1 with the power of the engine 12. At this time, in a case where the whole of a shortage of electric power with the battery output electric power Pbat is not covered with the capacitor output electric power Pcap, it is considered that the capacitor output electric power Pcap is not used, and the second electric motor MG2 is driven with the generated electric power Pmg1 of the first electric motor MG1 with the power of the engine 12 from the beginning. On the other hand, since the engine 12 is in the drive power non-generation state in the EV traveling mode, for electric power generation of the first electric motor MG1, it is necessary to increase the engine rotation speed Ne. For example, for electric power generation of the first electric motor MG1 in a case where the operation of the engine 12 is stopped, it is necessary to start the engine 12. After the increase of the engine rotation speed Ne starts (for example, after the engine 12 starts in a case where the operation of the engine 12 is stopped), the generated electric power Pmg1 of the first electric motor MG1 is not supplied until the engine rotation speed Ne increases and becomes the engine rotation speed Ne at which electric power generation can be performed in the first electric motor MG1, and it takes a lot of time until the generated electric power Pmg1 becomes a shortage of electric power with the battery output electric power Pbat. For this reason, according to the timing at which rotation speed increase control for increasing the engine rotation speed Ne for electric power generation of the first electric motor MG1 is executed after the second electric motor MG2 is driven with the capacitor output electric power Pcap (for example, the engine 12 starts in a case where the operation of the engine 12 is stopped), compensation of the generated electric power Pmg1 is delayed with respect to a decrease in the capacitor output electric power Pcap, the MG2 power Pmg2 temporarily decreases, and the required drive power Fddem of the vehicle 10 cannot be satisfied, whereby drivability may be degraded. In a case where the capacitor output electric power Pcap is not used and the rotation speed increase control of the engine 12 is executed from the beginning (for example, the engine 12 starts in a case where the operation of the engine 12 is stopped), a rise in the MG2 power Pmg2 may stagnate at the MG2 power Pmg2 for the battery output electric power Pbat until the generated electric power Pmg1 is generated. The rotation speed increase control of the engine 12 for electric power generation of the first electric motor MG1 is control for increasing the engine rotation speed Ne in order to cover electric power required for the second electric motor MG2 to implement the required drive power Fddem of the vehicle 10 with the generated electric power Pmg1 of the first electric motor MG1.

Accordingly, the electronic control unit 60 controls switching between the capacitor output electric power Pcap and the generated electric power Pmg1 of the first electric motor MG1 with the power of the engine 12 according to the capacitor residual capacity SOCcap, thereby implementing smooth acceleration and practical fuel efficiency improvement.

The electronic control unit 60 is further provided with, in order to implement smooth acceleration and practical fuel efficiency improvement described above, required electric power calculation means, that is, a required electric power calculation unit 64, electric power suppliable time calculation means, that is, an electric power suppliable time calculation unit 65, required reaching time calculation means, that is, a required reaching time calculation unit 66, rotation speed increase standby time determination means, that is, a rotation speed increase standby time determination unit 67, and electric power supply control means, that is, an electric power supply control unit 68.

The required electric power calculation unit 64 calculates the required electric power Pdem which is a required value of the generated electric power Pmg1 required for the first electric motor MG1 as electric power supplied to the second electric motor MG2 based on the required drive power Fddem of the vehicle 10.

Specifically, the required electric power calculation unit 64 calculates the MG2 power Pmg2 (hereinafter, referred to as required MG2 power Pmg2req) required to implement the required drive power Fddem, and calculates electric power (hereinafter, referred to as required electric power Preq) required for the second electric motor MG2 to output the required MG2 power Pmg2req. The hybrid control unit 62 determines whether or not the required MG2 power Pmg2req is covered with the MG2 power Pmg2 (hereinafter, referred to as MG2 power Pmg2 for battery output electric power Pbat) to be output from the second electric motor MG2 with the battery output electric power Pbat. That is, the hybrid control unit 62 determines whether or not a maximum value of the battery output electric power Pbat is equal to or greater than the required electric power Preq. In a case where it is determined that the required MG2 power Pmg2req is covered with the MG2 power Pmg2 for the battery output electric power Pbat, the hybrid control unit 62 outputs, to the inverter 50, the electric motor control command signal Sm for driving the second electric motor MG2 with the battery output electric power Pbat such that the required MG2 power Pmg2req is obtained. In a case where it is determined that the required MG2 power Pmg2req is not covered with the MG2 power Pmg2 for the battery output electric power Pbat, the hybrid control unit 62 outputs, to the inverter 50, the electric motor control command signal Sm for driving the second electric motor MG2 with, in addition to the battery output electric power Pbat, the capacitor output electric power Pcap whose supply is controlled by the electric power supply control unit 68 described below and/or the generated electric power Pmg1 of the first electric motor MG1 such that the required MG2 power Pmg2req is obtained. In a case where the hybrid control unit 62 determines that the required MG2 power Pmg2req is not covered with the MG2 power Pmg2 for the battery output electric power Pbat, the required electric power calculation unit 64 calculates a shortage of the MG2 power Pmg2 (hereinafter, referred to as shortage MG2 power Pmg2sht) with the MG2 power Pmg2 for the battery output electric power Pbat with respect to the required MG2 power Pmg2req. That is, the required electric power calculation unit 64 calculates a shortage of electric power with the battery output electric power Pbat with respect to the required electric power Preq as the required electric power Pdem (=Preq−Pbat).

The electric power suppliable time calculation unit 65 calculates an electric power suppliable time TMcap, for which the capacitor 54 can supply the electric power Pcap, from the time of starting the requirement of the required electric power Pdem until the time of the capacity decrease when the capacitor residual capacity SOCcap decreases to target residual capacity Qtgt. The electric power suppliable time TMcap is a time until the capacitor residual capacity SOCcap becomes the target residual capacity Qtgt with the supply of the capacitor output electric power Pcap.

Specifically, the hybrid control unit 62 determines whether or not the shortage MG2 power Pmg2sht is covered with the MG2 power Pmg2 (hereinafter, referred to as MG2 power Pmg2 for capacitor output electric power Pcap) to be output from the second electric motor MG2 with the capacitor output electric power Pcap. That is, the hybrid control unit 62 determines whether or not electric power Pcap (that is, a maximum value of the capacitor output electric power Pcap) to be output from the capacitor 54 is equal to or greater than the required electric power Pdem. In a case where the hybrid control unit 62 determines that the shortage MG2 power Pmg2sht is covered with the MG2 power Pmg2 for the capacitor output electric power Pcap (that is, the electric power Pcap to be output from the capacitor 54 is equal to or greater than the required electric power Pdem), the electric power suppliable time calculation unit 65 calculates the electric power suppliable time TMcap. Accordingly, the electric power suppliable time TMcap includes a time for which the capacitor 54 can supply the required electric power Pdem. Preferably, the capacitor output electric power Pcap does not need to be set to the required electric power Pdem in the entire time zone of the electric power suppliable time TMcap, and the capacitor output electric power Pcap may gradually decrease from the required electric power Pdem toward zero in conformity with an increase of the generated electric power Pmg1 from the time of starting electric power generation in a time zone of a required reaching time TMgen from the time of starting electric power generation of the first electric motor MG1 when electric power generation of the first electric motor MG1 is started until the time of reaching of the requirement when the generated electric power Pmg1 of the first electric motor MG1 reaches the required electric power Pdem. Therefore, the electric power suppliable time TMcap includes the time for which the capacitor 54 can supply the required electric power Pdem and a time for which the capacitor output electric power Pcap gradually decreases from the required electric power Pdem toward zero (that is, the required reaching time TMgen calculated by the required reaching time calculation unit 66 described below). In this way, it is possible to extend the electric power suppliable time TMcap compared to when the capacitor output electric power Pcap is set to the required electric power Pdem in the entire time zone.

Figure 3:
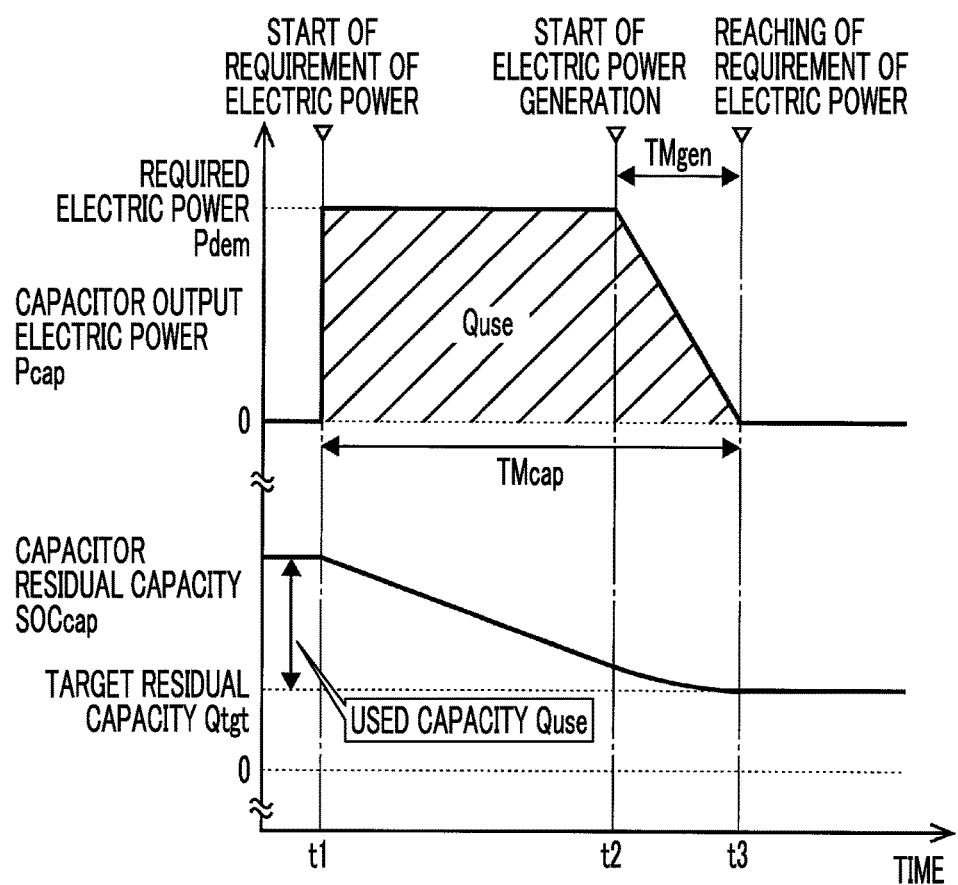
FIG. 3 is a diagram illustrating the relationship between capacitor output electric power and capacitor residual capacity.

FIG. 3 is a diagram illustrating the relationship between the capacitor output electric power Pcap and the capacitor residual capacity SOCcap. In FIG. 3, a time integration value of the capacitor output electric power Pcap becomes use capacity Quse used in the capacitor 54. In a period from the time t1 which becomes the time of starting the requirement of the required electric power Pdem until the time t2 which becomes the time of starting electric power generation of the first electric motor MG1, the required electric power Pdem is output as the capacitor output electric power Pcap, and in a period from the time t2 until the time t3 which becomes the time of reaching of the requirement when the generated electric power Pmg1 reaches the required electric power Pdem, the capacitor output electric power Pcap which gradually increases from the required electric power Pdem toward zero is output. With this, the capacitor residual capacity SOCcap decreases by the use capacity Quse over time from the time t1 until the time t3, and becomes the target residual capacity Qtgt at the time t3. Therefore, the electric power suppliable time calculation unit 65 calculates (calculates backward) the electric power suppliable time TMcap such that, at the time of starting the requirement of the required electric power Pdem, a value obtained by subtracting the target residual capacity Qtgt from the capacitor residual capacity SOCcap at this time matches the time integration value of the capacitor output electric power Pcap.

The required reaching time calculation unit 66 calculates the required reaching time TMgen. Specifically, the engine rotation speed Ne (hereinafter referred to as a required electric power generation engine rotation speed Nedem) at which the required electric power Pdem can be generated by electric power generation of the first electric motor MG1 is calculated using a relationship (required electric power map) determined in advance, and an engine increase time (that is, a required electric power generation time TMdem from the time of starting a rotation speed increase until the required electric power Pdem can be generated by the first electric motor MG1) from the time of starting the rotation speed increase when the engine 12 in the drive power non-generation state at the time of starting the requirement starts the rotation speed increase control for increasing the rotation speed for electric power generation of the first electric motor MG1 (for example, the time of starting the start of the engine 12 being stopped when the operation of the engine 12 is stopped) until the engine rotation speed Ne increases to the required electric power generation engine rotation speed Nedem using a relationship (engine increase time map) determined in advance. The engine increase time (required electric power generation time TMdem) includes a predetermined electric power generation delay time TMlag from the time of starting the rotation speed increase of the engine 12 until the time of starting electric power generation of the first electric motor MG1. Therefore, the required reaching time calculation unit 66 calculates the required reaching time TMgen by subtracting the electric power generation delay time TMlag from the required electric power generation time TMdem. The hybrid control unit 62 executes the rotation speed increase control by rotationally driving the engine 12 through powering of the first electric motor MG1 (for example, starts the engine 12 by cranking the engine 12 through powering of the first electric motor MG1 when the operation of the engine 12 is stopped). The hybrid control unit 62 dose not start electric power generation of the first electric motor MG1 until the engine 12 reaches the engine rotation speed Ne (hereinafter, referred to as an electric power generable engine rotation speed Negen) determined in advance such that self-operation is possible even if a load is applied due to electric power generation of the first electric motor MG1. While a time from the time of starting the rotation speed increase until the engine rotation speed Ne increases to the electric power generable engine rotation speed Negen changes according to the state of warming-up of engine 12, or the like, since it is considered that there is little difference, a uniform time is used. Therefore, the electric power generation delay time TMlag is a time from the time of starting the rotation speed increase until the engine rotation speed Ne increases to the electric power generable engine rotation speed Negen, and a predetermined time determined in advance is used. For the electric power generation delay time TMlag, a value mapped in advance according to the difference in the drive power non-generation state or the difference in the state of warning of the engine 12 may be used. It may be considered that, since the engine 12 is rotationally driven by the first electric motor MG1, the start of electric power generation is delayed.

The rotation speed increase standby time determination unit 67 determines a rotation speed increase standby time TMeng (≤TMmrg) such that the rotation speed increase standby time TMeng (for example, a start standby time TMeng from the time of starting the requirement of the required electric power Pdem until the time of starting the start of the engine 12 when the operation of the engine 12 is stopped) from the time of starting the requirement of the required electric power Pdem until the time of starting the rotation speed increase of the engine 12 becomes equal to or less than a spare time TMmrg (=TMcap−TMlag−TMgen) obtained by subtracting the electric power generation delay time TMlag and the required reaching time TMgen from the electric power suppliable time TMcap. The rotation speed increase standby time determination unit 67 determines the rotation speed increase standby time TMeng as the spare time TMmrg, for example.

The hybrid control unit 62 determines whether or not the rotation speed increase standby time TMeng has elapsed from the time of starting the requirement of the required electric power Pdem. In a case where it is determined that the rotation speed increase standby time TMeng has elapsed from the time of starting the requirement of the required electric power Pdem, the hybrid control unit 62 outputs the electric motor control command signal Sm for driving the first electric motor MG1 to the inverter 50 so as to rotationally drive the engine 12, and starts the rotation speed increase control of the engine 12. In a case where the engine rotation speed Ne increases to the electric power generable engine rotation speed Negen after the rotation speed increase control of the engine 12 starts, the hybrid control unit 62 outputs the electric motor control command signal Sm for driving the first electric motor MG1 to the inverter 50 so as to perform electric power generation, and starts electric power generation of the first electric motor MG1.

The electric power supply control unit 68 determines whether or not the time of starting electric power generation is reached based on whether or not the hybrid control unit 62 starts electric power generation of the first electric motor MG1. In a case where the hybrid control unit 62 determines that the shortage MG2 power Pmg2sht is covered with the MG2 power Pmg2 for the capacitor output electric power Pcap, the electric power supply control unit 68 supplies the capacitor output electric power Pcap to the second electric motor MG2 as the required electric power Pdem until it is determined that the time of starting electric power generation is reached from the time of starting the requirement of the required electric power Pdem. The electric power supply control unit 68 gradually decreases the capacitor output electric power Pcap from the required electric power Pdem toward zero in conformity with an increase of the generated electric power Pmg1 to the required electric power Pdem with the first electric motor MG1 after it is determined that the time of starting electric power generation is reached. The hybrid control unit 62 drives the second electric motor MG2 with, in addition to the battery output electric power Pbat, the capacitor output electric power Pcap whose supply is controlled by the electric power supply control unit 68 and/or the generated electric power Pmg1 of the first electric motor MG1, and outputs the continuous (drop-free) MG2 power Pmg2 (here, since the MG2 rotation speed Nmg2 is uniquely fixed by the vehicle speed V, the MG2 torque Tmg2 has the same meaning).

In a case where the hybrid control unit 62 determines that the shortage MG2 power Pmg2sht is not covered with the MG2 power Pmg2 for the capacitor output electric power Pcap (that is, the electric power Pcap to be output from the capacitor 54 is less than the required electric power Pdem), the rotation speed increase standby time determination unit 67 makes the rotation speed increase standby time TMeng zero. Therefore, in a case where it is determined that the shortage MG2 power Pmg2sht is not covered with the MG2 power Pmg2 for the capacitor output electric power Pcap, the hybrid control unit 62 starts the rotation speed increase control of the engine 12 quickly from the time of starting the requirement of the required electric power Pdem. In such a case, the electric power suppliable time calculation unit 65 calculates the electric power suppliable time TMcap such that the electric power suppliable time TMcap becomes equal to or greater than the total time (that is, the required electric power generation time TMdem calculated by the required reaching time calculation unit 66 from the time of starting the rotation speed increase of the engine 12 until the required electric power Pdem can be generated by the first electric motor MG1) of the electric power generation delay time TMlag and the required reaching time TMgen. For example, the electric power suppliable time calculation unit 65 sets the electric power suppliable time TMcap as the required electric power generation time TMdem. The electric power supply control unit 68 gradually decreases the capacitor output electric power Pcap toward zero from the time of starting the requirement of the required electric power Pdem such that the electric power suppliable time TMcap becomes equal to or greater than the required electric power generation time TMdem. For example, the electric power supply control unit 68 gradually decreases the capacitor output electric power Pcap toward zero such that the capacitor residual capacity SOCcap decreases to the target residual capacity Qtgt for the electric power suppliable time TMcap to be the required electric power generation time TMdem. The hybrid control unit 62 drives the second electric motor MG2 with, in addition the battery output electric power Pbat, the capacitor output electric power Pcap whose supply is controlled by the electric power supply control unit 68 and/or the generated electric power Pmg1 of the first electric motor MG1, and outputs the stagnation-free MG2 power Pmg2 (here, the MG2 torque Tmg2 has the same meaning).

Figure 4:
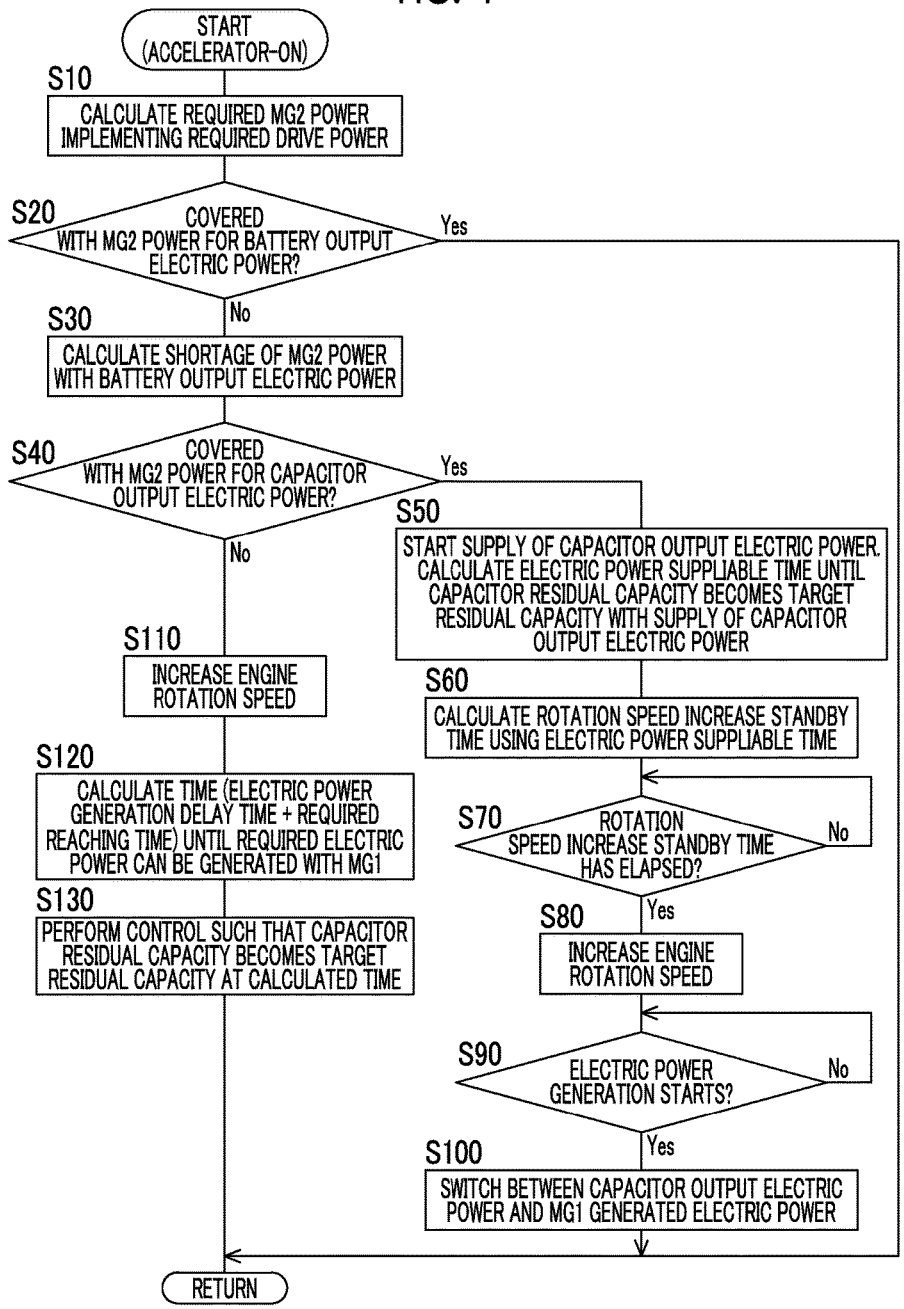
FIG. 4 is a flowchart illustrating a main part of control operation of an electronic control device, that is, control operation for suppressing degradation of drivability when accelerating with an output of a second electric motor.
Figure 5:
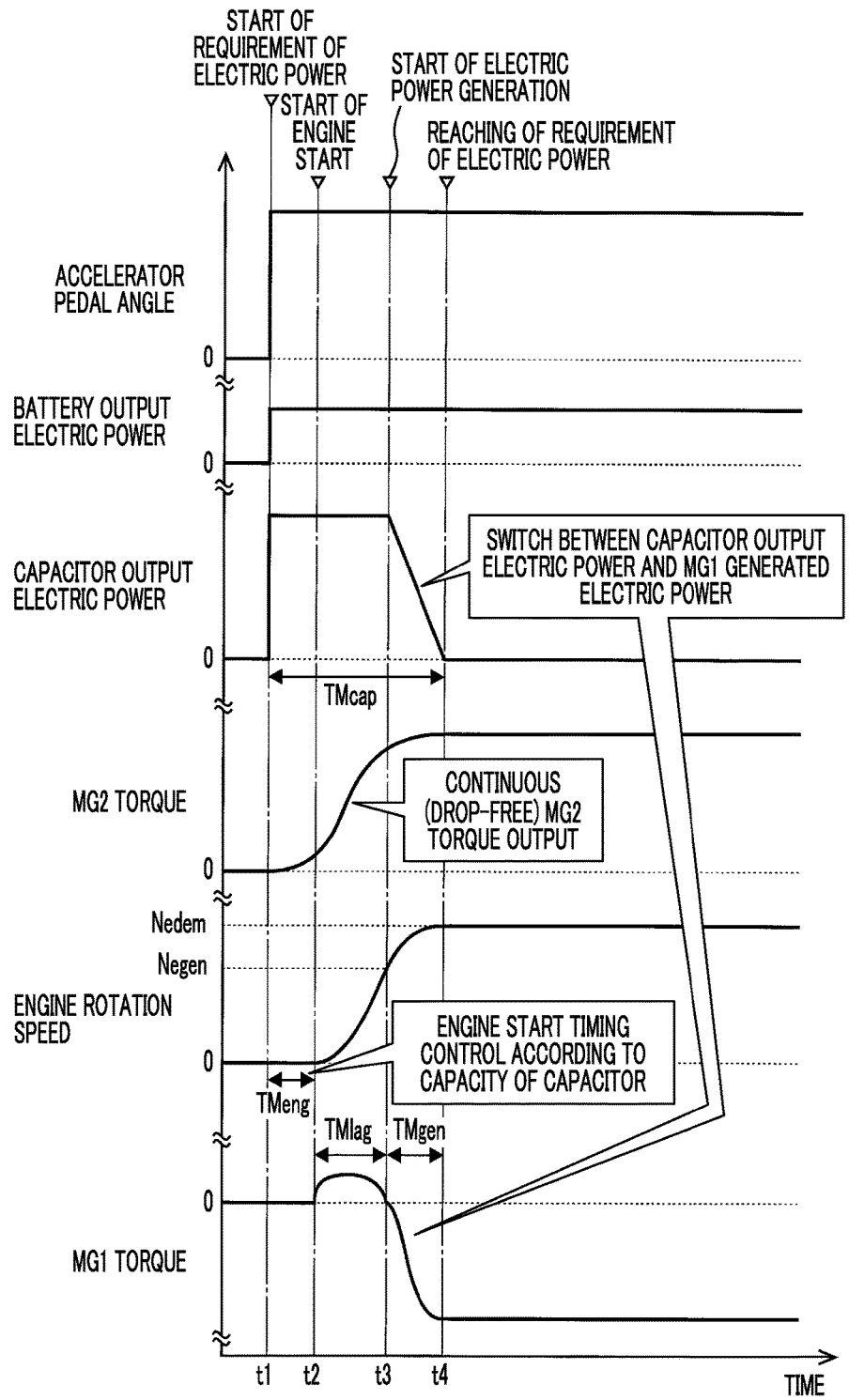
FIG. 5 is a time chart in a case where the control operation shown in the flowchart of FIG. 4 is executed in a case where an engine is in an operation stop state, and shows an example of a case where shortage MG2 power is covered with MG2 power for capacitor output electric power.
Figure 6:
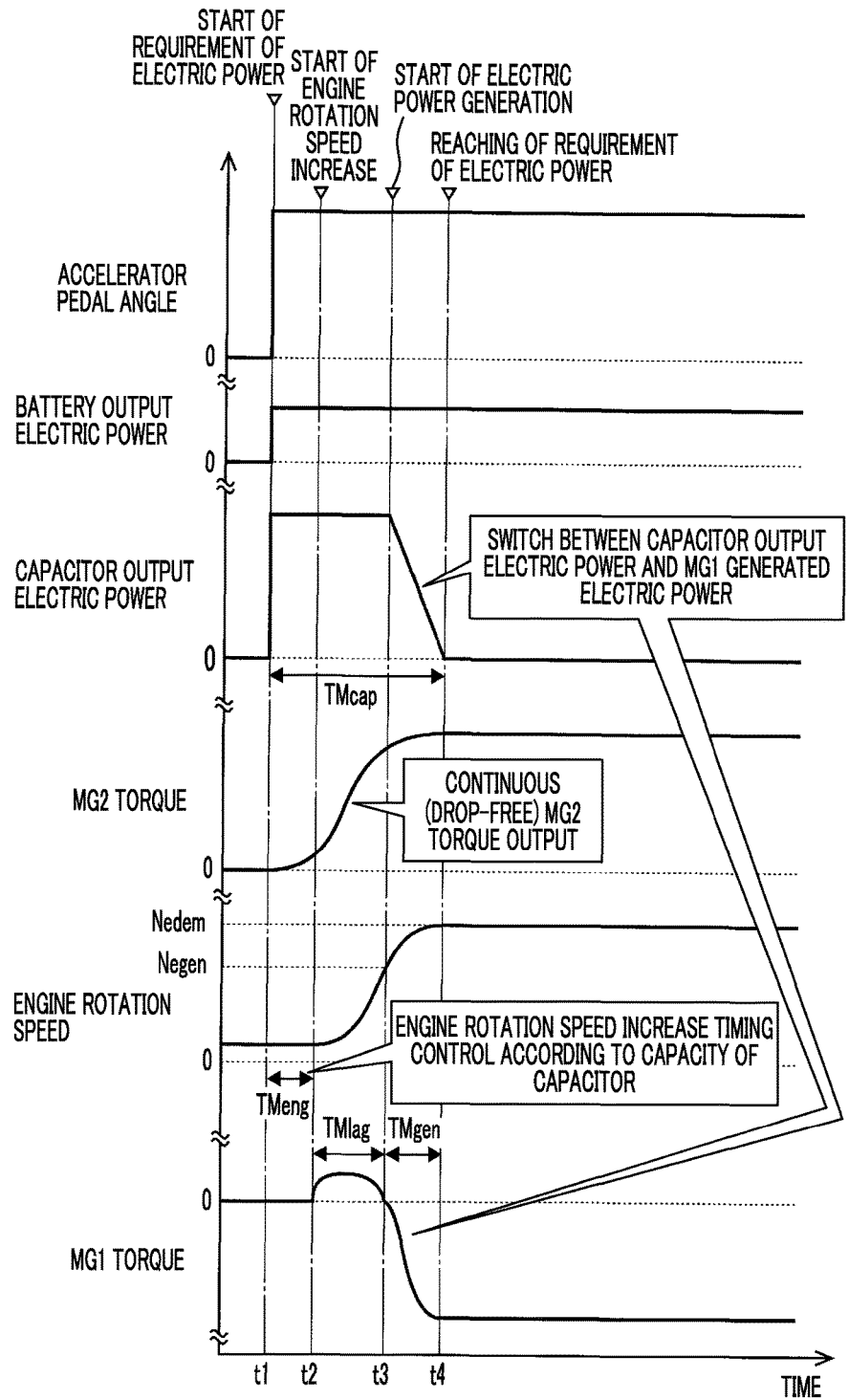
FIG. 6 is a time chart in a case where the control operation shown in the flowchart of FIG. 4 is executed in a case where the engine is in an idling state, and shows an example of a case where shortage MG2 power is covered with MG2 power for capacitor output electric power.
Figure 7:
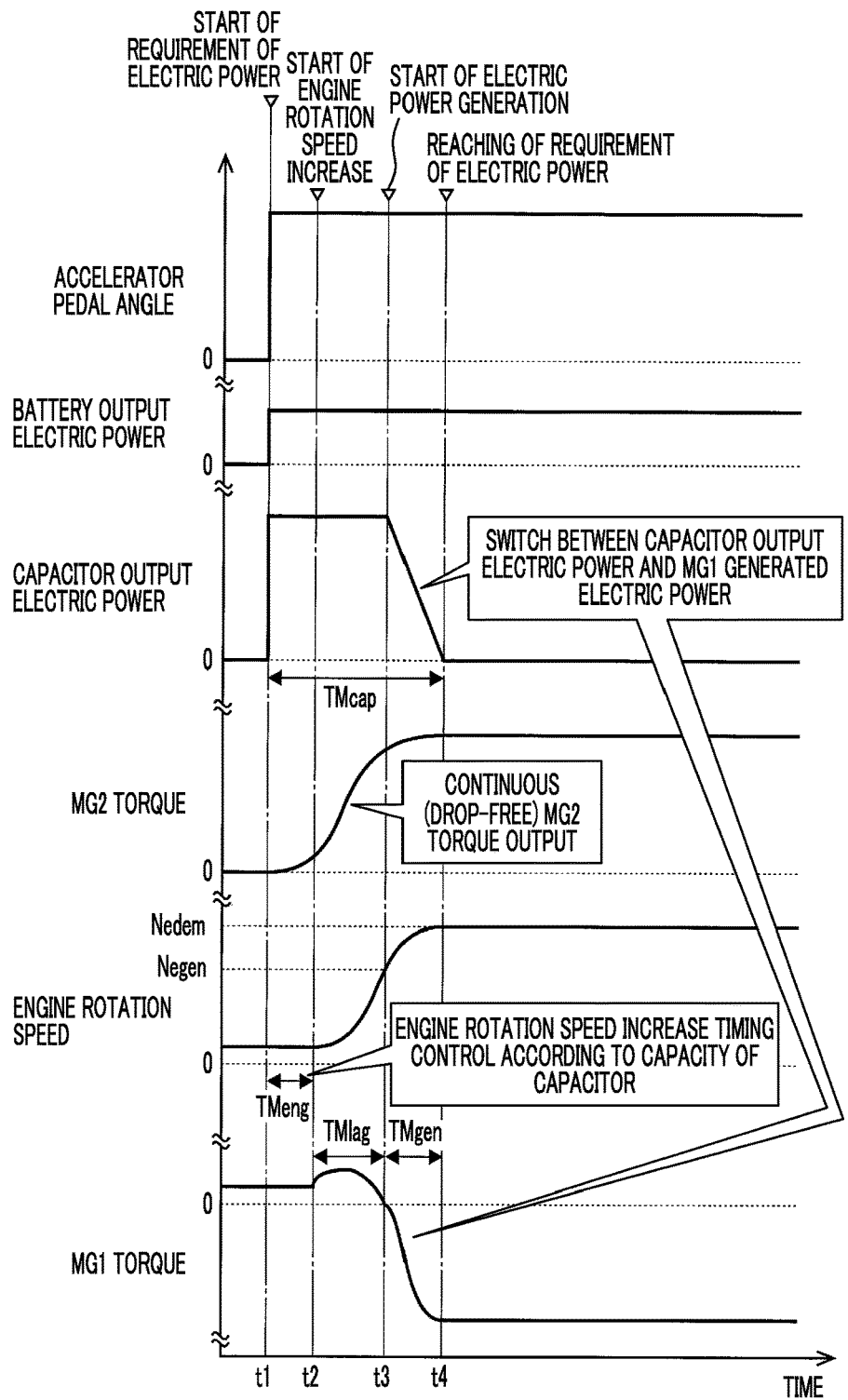
FIG. 7 is a time chart in a case where the control operation shown in the flowchart of FIG. 4 is executed in a case where the engine is in a motoring state, and shows an example of a case where shortage MG2 power is covered with MG2 power for capacitor output electric power.
Figure 8:
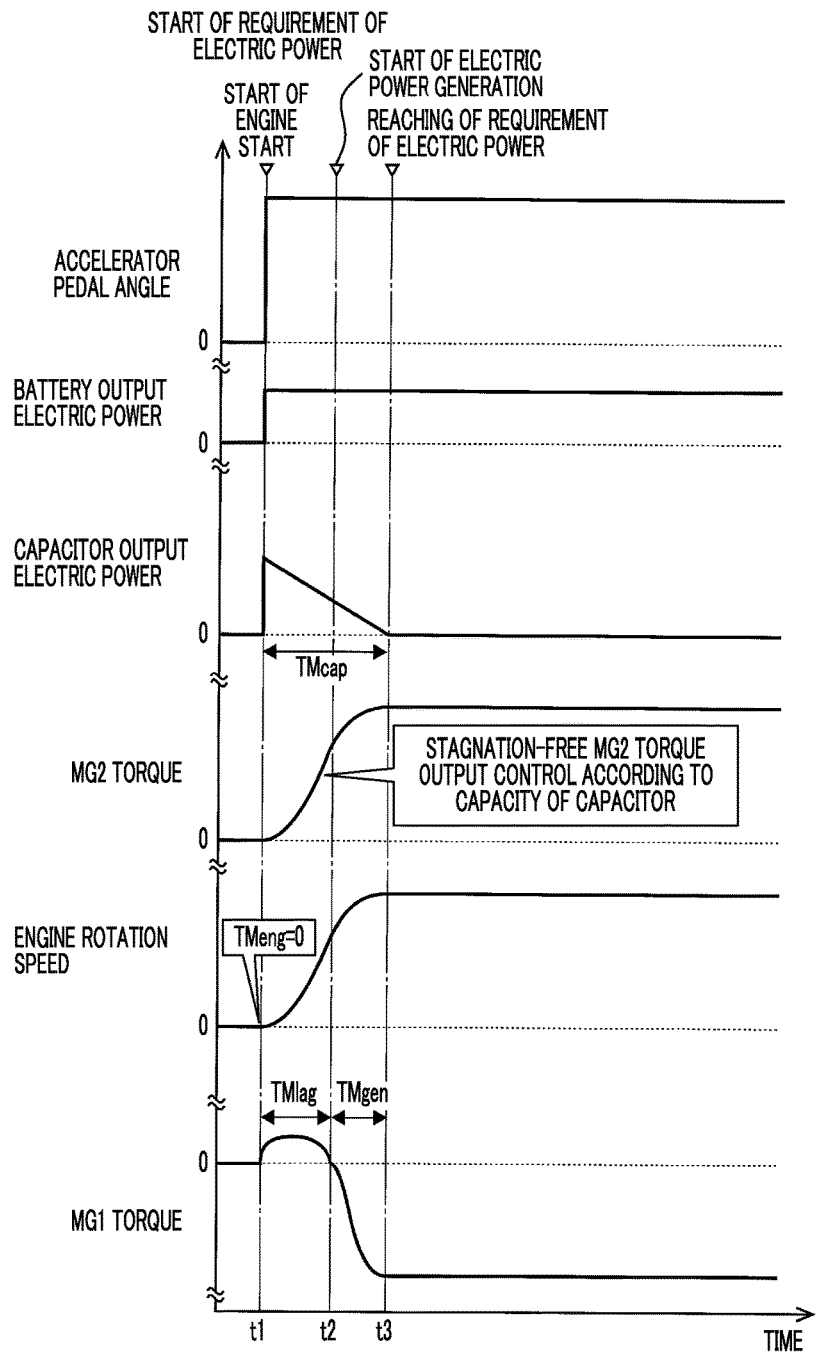
FIG. 8 is a time chart in a case where the control operation shown in the flowchart of FIG. 4 is executed in a case where the engine is in the operation stop state, and shows an example of a case where shortage MG2 power is not covered with MG2 power for capacitor output electric power.
Figure 9:
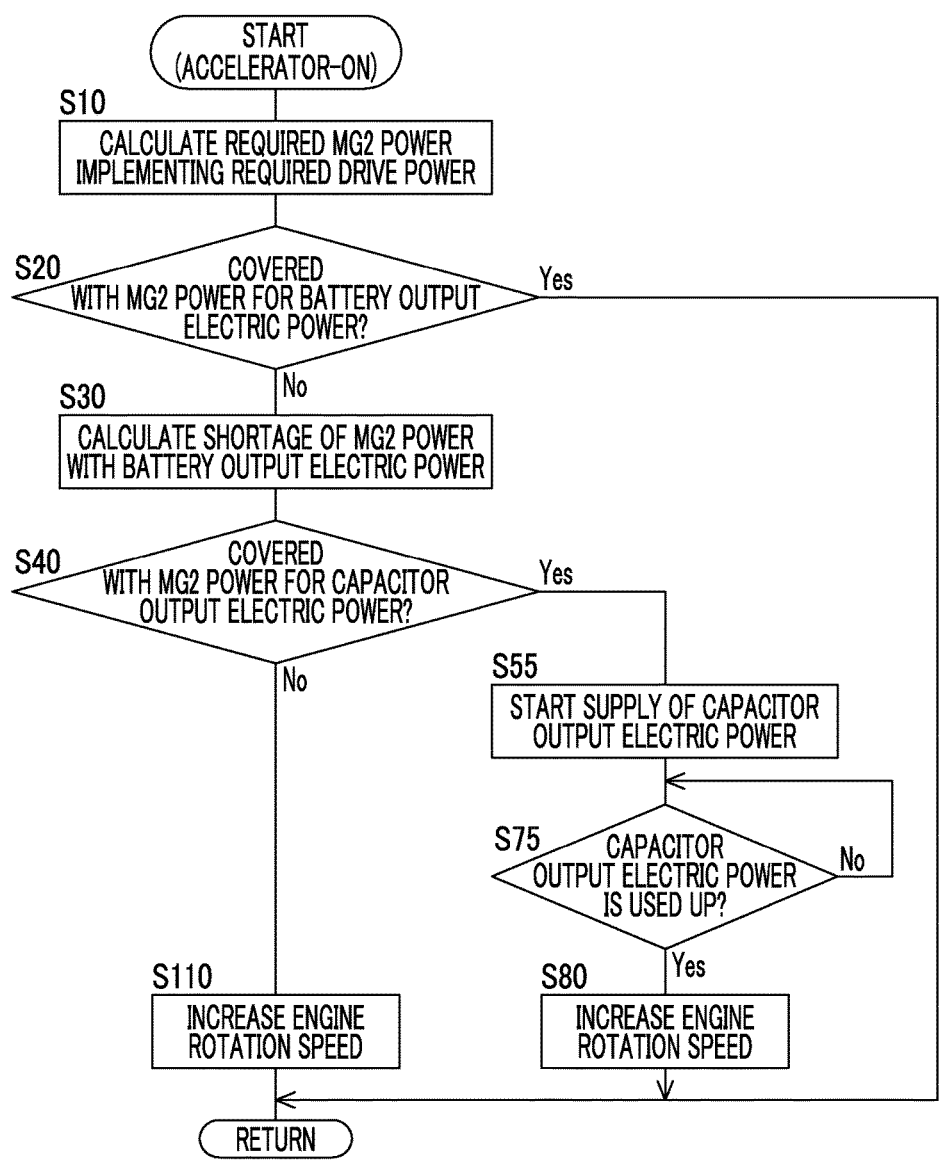
FIG. 9 is a flowchart illustrating a comparative example of this example shown in the flowchart of FIG. 4.

FIG. 4 is a flowchart illustrating a main part of control operation of the electronic control unit 60, that is, control operation for suppressing degradation of drivability when accelerating with the output of the second electric motor MG2, and is repeatedly executed during motor traveling accompanied by start according to accelerator-on or when the accelerator pedal angle θacc increases during motor traveling. FIG. 5 is a time chart in a case where the control operation shown in the flowchart of FIG. 4 is executed in a case where the engine 12 is in the operation stop state, and shows an example of a case where the shortage MG2 power Pmg2sht is covered with the MG2 power Pmg2 for the capacitor output electric power Pcap. FIG. 6 is a time chart in a case where the control operation shown in the flowchart of FIG. 4 is executed in a ease where the engine 12 is in the idling state, and shows an example of a case where the shortage MG2 power Pmg2sht is covered with the MG2 power Pmg2 for the capacitor output electric power Pcap. FIG. 7 is a time chart in a case where the control operation shown in the flowchart of FIG. 4 is executed in a case where the engine 12 is in the motoring state, and shows an example where the shortage MG2 power Pmg2sht is covered with the MG2 power Pmg2 for the capacitor output electric power Pcap. FIG. 8 is a time chart in a case where the control operation shown in the flowchart of FIG. 4 is executed in a case where the engine 12 is in the operation stop state, and shows an example of a case where the shortage MG2 power Pmg2sht is not covered with the MG2 power Pmg2 for the capacitor output electric power Pcap. FIG. 9 is a flowchart illustrating a comparative example of this example shown in the flowchart of FIG. 4. FIGS. 10 and 11 are respectively time charts in a case where control operation shown in the flowchart of FIG. 9 is executed in a case where the engine 12 is in the operation stop state, FIG. 10 shows an example of a case where the shortage MG2 power Pmg2sht is covered with the MG2 power Pmg2 for the capacitor output electric power Pcap, and FIG. 11 shows an example of a case where the shortage MG2 power Pmg2sht is not covered with the MG2 power Pmg2 for the capacitor output electric power Pcap.

In FIG. 4, first, in Step (hereinafter, Step will be omitted) S10 corresponding to the function of the required electric power calculation unit 64, the required MG2 power Pmg2req implementing the required drive power Fddem is calculated, and the required electric power Preq with which the second electric motor MG2 outputs the required MG2 power Pmg2req is calculated. Next, in S20 corresponding to the function of the hybrid control unit 62, it is determined whether or not the required MG2 power Pmg2req is covered with the MG2 power Pmg2 for the battery output electric power Pbat (that is, it is determined whether or not the maximum value of the battery output electric power Pbat is equal to or greater than the required electric power Preq). In a case where the determination of S20 is affirmative, this routine ends. In a case where the determination of S20 is negative, in S30 corresponding to the function of the required electric power calculation unit 64, the shortage MG2 power Pmg2sht which is a shortage with the MG2 power Pmg2 for the battery output electric power Pbat with respect to the required MG2 power Pmg2req is calculated (that is, a shortage of electric power with the battery output electric power Pbat with respect to the required electric power Preq is calculated as the required electric power Pdem (=Preq−Pbat)). Next, in S40 corresponding to the function of the hybrid control unit 62, it is determined whether or not the shortage MG2 power Pmg2sht is covered with the MG2 power Pmg2 for the capacitor output electric power Pcap (that is, it is determined whether or not the maximum value of the capacitor output electric power Pcap is equal to or greater than the required electric power Pdem). In a case where the determination of S40 is affirmative, in S50 corresponding to the function of the electric power supply control unit 68 and the function of the electric power suppliable time calculation unit 65, the supply of the capacitor output electric power Pcap to be the required electric power Pdem is started, and the electric power suppliable time TMcap until the capacitor residual capacity SOCcap becomes the target residual capacity Qtgt with the supply of the capacitor output electric power Pcap is calculated. Next, in S60 corresponding to the function of the rotation speed increase standby time determination unit 67, the rotation speed increase standby time TMeng (for example, the start standby time TMeng of the engine 12 when the operation of the engine 12 is stopped) of the engine 12 is calculated using the electric power suppliable time TMcap. For example, the rotation speed increase standby time TMeng becomes the spare time TMmrg obtained by subtracting the electric power generation delay time TMlag and the required reaching time TMgen from the electric power suppliable time TMcap. Next, in S70 corresponding to the function of the hybrid control unit 62, it is determined whether or not the rotation speed increase standby time TMeng has elapsed from the time of starting the requirement of the required electric power Pdem. In a case where the determination of S70 is negative, S70 is repeatedly executed. In a case where the determination of S70 is affirmative, in S80 corresponding to the function of the hybrid control unit 62, first electric motor MG1 is driven so as to rotationally drive the engine 12, and the rotation speed increase control of the engine 12 (for example, when the operation of the engine 12 is stopped, the start of the engine 12) is started. Next, in S90 corresponding to the function of the electric power supply control unit 68, it is determined. whether or not electric power generation of the first electric motor MG1 is started. In a case where the determination of S90 is negative, S90 is repeatedly executed. In a case where the determination of S90 is affirmative, in S100 corresponding to the function of the electric power supply control unit 68, the capacitor output electric power Pcap gradually decreases from the required electric power Pdem toward zero in conformity with the increase of the generated electric power Pmg1 of the first electric motor MG1 to the required electric power Pdem. In a case where the determination of S40 is negative, in S110 corresponding to the function of the hybrid control unit 62, the first electric motor MG1 is driven so as to rotationally drive the engine 12, and the rotation speed increase control of the engine 12 is started. Next, in S120 corresponding to the function of the required reaching time calculation unit 66, the required electric power generation time TMdem (=electric power generation delay time TMlag+required reaching time TMgen) from the time of starting the rotation speed increase of the engine 12 until the required electric power Pdem can be generated by the first electric motor MG1. Next, in S130 corresponding to the function of the electric power suppliable time calculation unit 65 and the function of the electric power supply control unit 68, the electric power suppliable time TMcap becomes the required electric power generation time TMdem, and the capacitor output electric power Pcap gradually decreases toward the zero such that the capacitor residual capacity SOCcap decreases to the target residual capacity Qtgt for the electric power suppliable time TMcap.

In the flowchart of FIG. 9, S55 and S75 are executed in place of S50 to S70 of FIGS. 4, S90 and S100 are not executed, and S120 and S130 are not executed. That is, in the flowchart of FIG. 9, in a case where the determination of S40 is affirmative, in S55 corresponding to the function of the electric power supply control unit 68, the supply of the capacitor output electric power Pcap to be the required electric power Pdem is started, and next, in S75 corresponding to the function of the electric power supply control unit 68, it is determined whether or not the capacitor output electric power Pcap is used up (that is, whether or not the capacitor output electric power Pcap becomes zero). In a case where the determination of S75 is negative, S75 is repeatedly executed, and in a case where the determination of S75 is affirmative, in S80 corresponding to the function of the hybrid control unit 62, the rotation speed increase control of the engine 12 is started. That is, in the comparative example shown in the flowchart of FIG. 9, in a case where the shortage MG2 power Pmg2sht is covered with the MG2 power Pmg2 for the capacitor output electric power Pcap, the rotation speed increase control of the engine 12 is not started until the capacitor output electric power Pcap is used up. For this reason, as shown in the time chart of FIG. 10, since the rotation speed increase control (here, the start) of the engine 12 is started after the capacitor output electric power Pcap is used up, the MG2 torque Tmg2 temporarily decreases until electric power generation of the first electric motor MG1 is started through the rotation speed increase control.

In contrast, in this example, in a case where the shortage MG2 power Pmg2sht is covered with the MG2 power Pmg2 for the capacitor output electric power Pcap, as shown in FIGS. 5, 6, and 7, the rotation speed increase standby time (in particular, in FIG. 5, the start standby time) TMeng from the time (time t1) of starting the requirement until the time (time t2) of starting the rotation speed increase is determined in consideration of the electric power generation delay time TMlag from the time (time t2) of starting the rotation speed increase (in particular, in FIG. 5, the time of starting the start) until the time (time t3) of starting electric power generation and the required reaching time TMgen from the time (time t3) of starting electric power generation until the time (time t4) of reaching of the requirement with respect to the electric power suppliable time TMcap (time t1 to time t4) for which the capacitor 54 can supply the electric power Pcap, and when the capacitor output electric power Pcap is used up, the generated electric power Pmg1 of the first electric motor MG1 is already suppliied, and the capacitor output electric power Pcap and the generated electric power Pmg1 are switched such that the capacitor output electric power Pcap decreases in conformity with the increase of the generated electric power Pmg1 of the first electric motor MG1. For this reason, the output of the continuous (drop-free) smooth MG2 torque Tmg2 is implemented.

In the flowchart of FIG. 9, in a case where the determination of S40 is negative, in S110 corresponding to the function of the hybrid control unit 62, the rotation speed increase control of the engine 12 is started. That is, in the comparative example shown in the flowchart of FIG. 9, in a case where the shortage MG2 power Pmg2sht is not covered with the MG2 power Pmg2 for the capacitor output electric power Pcap, the rotation speed increase control of the engine 12 is executed, the generated electric power Pmg1 of the first electric motor MG1 is merely supplied, and the capacitor output electric power Pcap is not supplied. For this reason, as shown in the time chart of FIG. 11, while the rotation speed increase control (here the start) of the engine 12 is started from the time of starting the requirement, the MG2 torque Tmg2 temporarily stagnates until the start of the engine 12 is completed and electric power generation of the first electric motor MG1 is started after the MG2 torque Tmg2 rises with the supply of the battery output electric power Pbat.

In contrast, in this example, in a case where the shortage MG2 power Pmg2sht is not covered with the MG2 power Pmg2 for the capacitor output electric power Pcap, as shown in FIG. 8, the rotation speed increase control (here, the start) of the engine 12 is started from the time of starting the requirement (time t1) and the capacitor output electric power Pcap is supplied. The capacitor output electric power Pcap gradually decreases such that the capacitor residual capacity SOCcap decreases to the target residual capacity Qtgt in consideration of the electric power generation delay time TMlag from the time (time t1) of starting the rotation speed increase (here, the time of starting the start) until the time (time t2) of starting electric power generation and the required reaching time TMgen from the time (time t2) of starting electric power generation until the time (time t3) of reaching of the requirement. With this, the output of the stagnation-free MG2 torque Tmg2 is implemented.

As described above, according to this example, the rotation speed increase standby time TMeng is determined such that the rotation speed increase standby time TMeng from the time of starting the requirement of the required electric power Pdem until the time of starting the rotation speed increase of the engine 12 becomes equal to or less than the spare time TMmrg (=TMcap−TMlag−TMgen) obtained by subtracting the electric power generation delay time TMlag from the time of starting the rotation speed increase until the time of starting electric power generation of the first electric motor MG1 and the required reaching time TMgen from the time of starting electric power generation until the generated electric power Pmg1 of the first electric motor MG1 reaches the required electric power Pdem from the electric power suppliable time TMcap for which the capacitor 54 can supply the electric power Pcap. For this reason, when the second electric motor MG2 is started to be driven with the capacitor output electric power Pcap, and then, the electric power suppliable time TMcap has elapsed and the capacitor 54 does not supply electric power, the required electric power Pdem is satisfied with the generated electric power Pmg1 of the first electric motor MG1. Hence, it is possible to further suppress degradation of drivability when accelerating with the output of the second electric motor MG2. Furthermore, the rotation speed increase control of the engine 12 is delayed with respect to the time of starting the requirement, hereby it is possible to improve fuel efficiency.

According to this example, since the electric power suppliable time TMcap includes the time for which the capacitor 54 can supply the required electric power Pdem, acceleration is appropriately performed with the output of the second electric motor MG2.

According to this example, since the capacitor output electric power Pcap gradually decreases from the required electric power Pdem toward zero in conformity with the increase of the generated electric power Pmg1 of the first electric motor MG1 from the time of starting electric power generation, after the capacitor output electric power Pcap decreases, the generated electric power Pmg1 of the first electric motor MG1 instantly compensates for electric power. Hence, it is possible to further suppress degradation of drivability when accelerating with the output of the second electric motor MG2. Furthermore, electric power supplied to the second electric motor MG2 is smoothly switched from the capacitor output electric power Pcap to the generated electric power Pmg1 of the first electric motor MG1, and smooth acceleration is obtained.

According to this example, since the electric power suppliable time TMcap includes the time for which the capacitor 54 can supply the required electric power Pdem and the time for which the capacitor output electric power Pcap gradually decreases from the required electric power Pdem toward zero, acceleration is appropriately performed with the output of the second electric motor MG2, and electric power supplied to the second electric motor MG2 is smoothly switched from the capacitor output electric power Pcap to the generated electric power Pmg1 of the first electric motor MG1. Furthermore, since the electric power suppliable time TMcap is further extended, the rotation speed increase standby time TMeng is extended, whereby it is possible to further improving fuel efficiency.

According to this example, in a case where electric power to be output from the capacitor 54 is less than the required electric power Pdem, the rotation speed increase standby time TMeng becomes zero, and the capacitor output electric power Pcap gradually decreases toward zero from the time of starting the requirement such that the electric power suppliable time TMcap becomes equal to or greater than the total time of the electric power generation delay time TMlag and the required reaching time TMgen. For this reason, even in a case where electric power to be output from the capacitor 54 is less than the required electric power Pdem, it is possible to compensate for a shortage of the generated electric power Pmg1 of the first electric motor MG1 in a period from the time of starting the requirement until the time of reaching of the requirement using the capacitor output electric power Pcap, and to suppress degradation of drivability. That is, in a case where electric power to be output from the capacitor 54 is less than the required electric power Pdem, an aspect in which electric power of the capacitor 54 compensates for a delay of the supply of the generated electric power Pmg1 of the first electric motor MG1 is employed, instead of employing an aspect in which electric power is not supplied from the capacitor 54. For this reason, it is possible to suppress degradation of drivability.

According to this example, a shortage of electric power with the battery output electric power Pbat is supplied with the generated electric power Pmg1 of the first electric motor MG1. When the supply of the generated electric power Pmg1 of the first electric motor MG1 is started, after the capacitor output electric power Pcap is supplied, the second electric motor MG2 is driven with the generated electric power Pmg1 of the first electric motor MG1. Hence, it is possible to suppress degradation of drivability when accelerating with the output of the second electric motor MG2.

Although the example of the present disclosure has been described above in detail, the present disclosure is also applied in other aspects.

For example, in the above-described example, although the rotation speed increase standby time determination unit 67 (S60 of the flowchart of FIG. 4 corresponding to the function of the rotation speed increase standby time determination unit 67) determines the rotation speed increase standby time TMeng (≤TMmrg) such that the rotation speed increase standby time TMeng becomes equal to or less than the spare time TMmrg (=TMcap−TMlag−TMgen) obtained by subtracting the electric power generation delay time TMlag and the required reaching time TMgen from the electric power suppliable time TMcap (in S60, becomes the spare time TMmrg), the present disclosure is not limited to this aspect. This aspect is intended that the supply of electric power from the capacitor 54 ends when the required electric power Pdem is completely covered with the generated electric power Pmg1 of the first electric motor MG1. That is, this aspect is intended that the rotation speed increase standby time TMeng is determined such that the time (=TMeng+TMlag+TMgen) from the time of starting the requirement (that is, the time of starting acceleration) of the required electric power Pdem until the required electric power Pdem is completely covered with the generated electric power Pmg1 of the first electric motor MG1 becomes equal to or less than the time (=TMcap) until the supply of electric power of the capacitor 54 ends. In addition to these purposes, it is also intended that the generated electric power Pmg1 of the first electric motor MG1 may compensate for even a part of the required electric power Pdem. That is, it may also be intended that the rotation speed increase standby time TMeng is determined such that the time (=TMeng+TMlag) from the time of starting acceleration until electric power generation of the first electric motor MG1 starts becomes shorter than the time (=TMcap) until the supply of electric power of the capacitor 54 ends. Accordingly, the rotation speed increase standby time determination unit 67 may be determine the rotation speed increase standby time TMeng (<TMmrg) such that the rotation speed increase standby time TMeng becomes shorter than the spare time TMmrg(=TMcap−TMlag) obtained by subtracting the electric power generation delay time TMlag from the electric power suppliable time TMcap. With this, the second electric motor MG2 is started to be driven with the capacitor output electric power Pcap, and then, when the electric power suppliable time TMcap has elapsed and the capacitor 54 does not supply electric power, the second electric motor MG2 is driven with the generated electric power Pmg1 of the first electric motor MG1. Hence, it is possible to suppress degradation of drivability when accelerating with the output of the second electric motor MG2. Furthermore, the rotation speed increase control of the engine 12 is delayed with respect to the time of starting the requirement, whereby it is possible to improve fuel efficiency.

In the above-described example, although the capacitor output electric power Pcap gradually decreases from the required electric power Pdem toward zero in conformity with the increase of the generated electric power Pmg1 from the time of starting electric power generation in the time zone of the required reaching time TMgen out of the electric power suppliable time TMcap, the present disclosure is not limited to this aspect. For example, the capacitor output electric power Pcap may be set to the required electric power Pdem in the entire time zone of the electric power suppliable time TMcap. With this, while the electric power suppliable time TMcap is shortened compared to when the capacitor output electric power Pcap gradually decreases in a part of the time zone, a given effect capable of suppressing degradation of drivability or improving fuel efficiency is obtained.

In the above-described example, although, in a case where the shortage MG2 power Pmg2sht is not covered with the MG2 power Pmg2 for the capacitor output electric power Pcap, the electric power suppliable time TMcap becomes equal to or greater than the total time (that is, the required electric power generation time TMdem from the time of starting the rotation speed increase of the engine 12 until the required electric power Pdem can be generated by the first electric motor MG1) of the electric power generation delay time TMlag and the required reaching time TMgen, the present disclosure is not limited to this aspect. For example, electric power generation of the first electric motor MG1 may not be started until the supply of electric power of the capacitor 54 ends. That is, an aspect may be made in which the electric power suppliable time TMcap becomes longer than the electric power generation delay time TMlag.

In the above-described example, although the rotation speed increase control is executed by rotationally driving the engine 12 through powering of the first electric motor MG1 (for example, the engine 12 is started by cranking the engine 12 through powering of the first electric motor MG1 When the operation of the engine 12 is stopped), in a case where the drive power non-generation state of the engine 12 is the idling state of the engine 12, the rotation speed increase control may be executed through control of the engine 12 itself without rotationally driving the engine 12 through powering of the first electric motor MG1. In a case where the engine 12 is in the idling state, the engine 12 may be rotationally driven by the first electric motor MG1 in addition to the control of the engine 12 itself. In this case, it is possible to faster increase the engine rotation speed Ne in the rotation speed increase control.

In the above-described example, although the planetary gear mechanism 40 is a single-planetary type, a double-planetary type may be provided. Furthermore, the planetary gear mechanism 40 may be a differential gear device in which a pinion configured to be rotationally driven by the engine 12 and a pair of bevel gears configured to mesh with the pinion are operatively coupled to the first electric motor MG1 and the drive gear 24. In addition, the planetary gear mechanism 40 is a mechanism in which two or more planetary gear devices are coupled to one another through a part of rotating elements constituting the planetary gear devices and an engine, an electric motor, and drive wheels are coupled to the rotating elements of the planetary gear devices such that power transmission is possible.

In the above-described example, although the vehicle 10 is provided with the gear shift unit 22 which functions as an electric continuously variable transmission, the present disclosure is not limited to this aspect. For example, a hybrid vehicle to which the present disclosure is applied may be a series hybrid vehicle in which the motor for electric power generation generates electric power with the power of the internal combustion engine, the motor for drive is driven with the generated electric power of the motor for electric power generation, and motor traveling can be performed in a state in which the internal combustion engine is brought into the drive power non-generation state (for example, in a state in which the operation is stopped). In summary, the present disclosure can be applied to a hybrid vehicle as long as the hybrid vehicle is provided with a motor for drive which generates power for traveling, a capacitor which is able to supply stored electric power to the motor for drive, a motor for electric power generation which is able to supply generated electric power to the motor for drive, and an internal combustion engine which outputs power to cause the motor for electric power generation to generate electric power. In such a meaning, the battery 52 is not necessarily provided. In a case where the battery 52 is not provided, S20 in the flowchart of FIG. 4 is not provided.

It should be noted that the above-described example is merely an embodiment, and the present disclosure can be carried out in aspects to which various modifications and improvements are added based on knowledge of those skilled in the art.

What is claimed is:

1. A control device for hybrid vehicle, the hybrid vehicle including a motor for drive, a capacitor, a motor for electric power generation, and an internal combustion engine, the motor for drive being configured to generate power for traveling the vehicle, the capacitor being configured to supply stored electric power to the motor for drive, the motor for electric power generation being configured to supply generated electric power to the motor for drive, and the internal combustion engine being configured to output power causing the motor for electric power generation to generate electric power, the control device comprising:
an electronic control unit configured to:
calculate required electric power required for the motor for electric power generation as electric power supplied to the motor for drive based on required drive power of the hybrid vehicle;
calculate an electric power suppliable time of the capacitor, the electric power suppliable time being a time from a time of starting a requirement of the required electric power until a time when charging capacity of the capacitor decreases to target residual capacity; and
determine a rotation speed increase standby time of the internal combustion engine such that the rotation speed increase standby time becomes shorter than a spare time, the rotation speed increase standby time being a time from the time of starting the requirement of the required electric power until a time of starting a rotation speed increase, the time of starting the rotation speed increase being a time when the internal combustion engine, which is in a drive power non-generation state at the time of starting the requirement of the required electric power, starts rotation speed increase control for increasing the rotation speed for electric power generation of the motor for electric power generation, the spare time being a time obtained by subtracting an electric power generation delay time from the electric power suppliable time, and the electric power generation delay time being a time from the time of starting the rotation speed increase until a time of starting electric power generation of the motor for electric power generation.

2. The control device according to claim 1, wherein:
the electronic control unit is configured to calculate a required reaching time, the required reaching time being a time from the time of starting electric power generation until a time of reaching of the requirement when the generated electric power of the motor for electric power generation reaches the required electric power; and
the electronic control unit is configured to determine the rotation speed increase standby time such that the rotation speed increase standby time is equal to or less than a spare time obtained by subtracting the electric power generation delay time and the required reaching time from the electric power suppliable time.

3. The control device according to claim 1, wherein the electric power suppliable time includes a time for which the capacitor is able to supply the required electric power.

4. The control device according to claim 1, wherein the electronic control unit is configured to gradually decrease electric power supplied from the capacitor from the required electric power toward zero in conformity with an increase of the generated electric power of the motor for electric power generation from the time of starting electric power generation.

5. The control device according to claim 4, wherein the electric power suppliable time includes a time for which the capacitor is able to supply the required electric power and a time for which electric power supplied from the capacitor gradually decreases from the required electric power toward zero.

6. The control device according to claim 1, wherein:
the electronic control unit is configured to make the rotation speed increase standby time zero in a case where electric power to be output from the capacitor is less than the required electric power;
the electronic control unit is configured to calculate a required reaching time from the time of starting electric power generation until the time of reaching of the requirement when the generated electric power of the motor for electric power generation reaches the required electric power; and
the electronic control unit is configured to gradually decrease electric power supplied from the capacitor toward zero from the time of starting the requirement such that the electric power suppliable time becomes equal to or greater than a total time of the electric power generation delay time and the required reaching time.

7. The control device according to claim 1, wherein:
the hybrid vehicle includes a battery which is able to supply stored electric power to the motor for drive;
the capacitor is configured to supply electric power to the motor for drive in addition to electric power supplied from the battery; and
the electronic control unit is configured to calculate, as the required electric power, a shortage of electric power with electric power supplied from the battery with respect to electric power required for an output of the motor for drive implementing the required drive power of the hybrid vehicle.

* * * * *